US005107451A

United States Patent [19]
Houk

[11] Patent Number: 5,107,451
[45] Date of Patent: Apr. 21, 1992

[54] METHOD AND APPARATUS FOR PIPELINED DETECTION OF OVERFLOW IN RESIDUE ARITHMETIC MULTIPLICATION

[75] Inventor: Theodore L. Houk, Seattle, Wash.

[73] Assignee: The Boeing Company, Seattle, Wash.

[21] Appl. No.: 472,237

[22] Filed: Jan. 30, 1990

[51] Int. Cl.$^5$ .............................................. G06F 7/52
[52] U.S. Cl. ............................... 364/746; 364/715.01; 364/713
[58] Field of Search ...................... 340/146.2; 364/746, 364/713, 745, 754, 715.01

[56] References Cited

U.S. PATENT DOCUMENTS

| | | | |
|---|---|---|---|
| 4,064,400 | 12/1977 | Akushsky et al. | 364/746 |
| 4,121,298 | 10/1978 | Akushsky et al. | 364/746 |
| 4,225,849 | 9/1980 | Lai | 340/146.2 |
| 4,797,843 | 1/1989 | Falk et al. | 364/713 |
| 4,864,524 | 9/1989 | Guilfoyle et al. | 364/713 |

OTHER PUBLICATIONS

N. S. Szabo, M. S. et al., "Residue Arithmetic and its Applications to Computer Technology", McGraw-Hill Book Company, pp. 12-105.

Taylor, F. J., "Risidue Arithmetic: A Tutorial with Examples", *Computer*, May 1984, pp. 50-62.

*Primary Examiner*—Tan V. Mai
*Attorney, Agent, or Firm*—Foley & Lardner

[57] ABSTRACT

A residue number system multiplication overflow detection processor generates either a VALID signal or an INVALID signal indicating whether multiplication overflow has occurred. Operands X and Y are received in residue representation and are multiplied in a multiplier. The X and Y operands are also converted to mixed base representation. The mixed base representations of the operands are compared in order to generate magnitude measures indicative of the magnitude of each of the operands. These magnitude measures and a mixed base representation of the product are used to generate the VALID and INVALID signals. The invention is particularly well-suited to be implemented using optical technologies.

35 Claims, 19 Drawing Sheets

| Decimal Number | Residue Number | | | Mixed Base Number | | |
|---|---|---|---|---|---|---|
| | $r_3$ | $r_2$ | $r_1$ | $a_3$ | $a_2$ | $a_1$ |
| | $(m_3=5)$ | $(m_2=3)$ | $(m_1=2)$ | $(W_3=6)$ | $(W_2=2)$ | $(W_1=1)$ |
| 0 | 0 | 0 | 0 | 0 | 0 | 0 |
| 1 | 1 | 1 | 1 | 0 | 0 | 1 |
| 2 | 2 | 2 | 0 | 0 | 1 | 0 |
| 3 | 3 | 0 | 1 | 0 | 1 | 1 |
| 4 | 4 | 1 | 0 | 0 | 2 | 0 |
| 5 | 0 | 2 | 1 | 0 | 2 | 1 |
| 6 | 1 | 0 | 0 | 1 | 0 | 0 |
| 7 | 2 | 1 | 1 | 1 | 0 | 1 |
| 8 | 3 | 2 | 0 | 1 | 1 | 0 |
| 9 | 4 | 0 | 1 | 1 | 1 | 1 |
| 10 | 0 | 1 | 0 | 1 | 2 | 0 |
| 11 | 1 | 2 | 1 | 1 | 2 | 1 |
| 12 | 2 | 0 | 0 | 2 | 0 | 0 |
| 13 | 3 | 1 | 1 | 2 | 0 | 1 |
| 14 | 4 | 2 | 0 | 2 | 1 | 0 |
| 15 | 0 | 0 | 1 | 2 | 1 | 1 |
| 16 | 1 | 1 | 0 | 2 | 2 | 0 |
| 17 | 2 | 2 | 1 | 2 | 2 | 1 |
| 18 | 3 | 0 | 0 | 3 | 0 | 0 |
| 19 | 4 | 1 | 1 | 3 | 0 | 1 |
| 20 | 0 | 2 | 0 | 3 | 1 | 0 |
| 21 | 1 | 0 | 1 | 3 | 1 | 1 |
| 22 | 2 | 1 | 0 | 3 | 2 | 0 |
| 23 | 3 | 2 | 1 | 3 | 2 | 1 |
| 24 | 4 | 0 | 0 | 4 | 0 | 0 |
| 25 | 0 | 1 | 1 | 4 | 0 | 1 |
| 26 | 1 | 2 | 0 | 4 | 1 | 0 |
| 27 | 2 | 0 | 1 | 4 | 1 | 1 |
| 28 | 3 | 1 | 0 | 4 | 2 | 0 |
| 29 | 4 | 2 | 1 | 4 | 2 | 1 |

FIG. 1

|   |   |   |   |
|---|---|---|---|
| | 0 | 2 | 1 | decimal number 5 |
| x | 2 | 1 | 1 | decimal number 7 |
| | 0 mod 5 | 2 mod 3 | 1 mod 2 |
| | 0 | 2 | 1 |

| Decimal Number | Residue Number | | | Mixed Base Number | | |
|---|---|---|---|---|---|---|
| | $r_3$ ($m_3=5$) | $r_2$ ($m_2=3$) | $r_1$ ($m_1=2$) | $a_3$ ($W_3=6$) | $a_2$ ($W_2=2$) | $a_1$ ($W_1=1$) |
| 0 | 0 | 0 | 0 | 0 | 0 | 0 |
| 1 | 1 | 1 | 1 | 0 | 0 | 1 |
| 2 | 2 | 2 | 0 | 0 | 1 | 0 |
| 3 | 3 | 0 | 1 | 0 | 1 | 1 |
| 4 | 4 | 1 | 0 | 0 | 2 | 0 |
| 5 | 0 | 2 | 1 | 0 | 2 | 1 |
| 6 | 1 | 0 | 0 | 1 | 0 | 0 |
| 7 | 2 | 1 | 1 | 1 | 0 | 1 |
| 8 | 3 | 2 | 0 | 1 | 1 | 0 |
| 9 | 4 | 0 | 1 | 1 | 1 | 1 |
| 10 | 0 | 1 | 0 | 1 | 2 | 0 |
| 11 | 1 | 2 | 1 | 1 | 2 | 1 |
| 12 | 2 | 0 | 0 | 2 | 0 | 0 |
| 13 | 3 | 1 | 1 | 2 | 0 | 1 |
| 14 | 4 | 2 | 0 | 2 | 1 | 0 |
| −15 | 0 | 0 | 1 | 2 | 1 | 1 |
| −14 | 1 | 1 | 0 | 2 | 2 | 0 |
| −13 | 2 | 2 | 1 | 2 | 2 | 1 |
| −12 | 3 | 0 | 0 | 3 | 0 | 0 |
| −11 | 4 | 1 | 1 | 3 | 0 | 1 |
| −10 | 0 | 2 | 0 | 3 | 1 | 0 |
| −9 | 1 | 0 | 1 | 3 | 1 | 1 |
| −8 | 2 | 1 | 0 | 3 | 2 | 0 |
| −7 | 3 | 2 | 1 | 3 | 2 | 1 |
| −6 | 4 | 0 | 0 | 4 | 0 | 0 |
| −5 | 0 | 1 | 1 | 4 | 0 | 1 |
| −4 | 1 | 2 | 0 | 4 | 1 | 0 |
| −3 | 2 | 0 | 1 | 4 | 1 | 1 |
| −2 | 3 | 1 | 0 | 4 | 2 | 0 |
| −1 | 4 | 2 | 1 | 4 | 2 | 1 |

FIG. 4

Ring Circumference: 30
Valid range: −15   14

|  |  | Moduli | | | Mixed base weights | | |
|---|---|---|---|---|---|---|---|
|  |  | $m_3$ | $m_2$ | $m_1$ | $w_3$ | $w_2$ | $w_1$ |
|  |  | 2 | 5 | 3 | 15 | 3 | 1 |
| Decimal Number | Ring Position | Residues | | | Mixed base digits | | |
|  |  | $r_3$ | $r_2$ | $r_1$ | $a_3$ | $a_2$ | $a_1$ |
| 0 | 0 | 0 | 0 | 0 | 0 | 0 | 0 |
| 1 | 1 | 1 | 1 | 1 | 0 | 0 | 1 |
| 2 | 2 | 0 | 2 | 2 | 0 | 0 | 2 |
| 3 | 3 | 1 | 3 | 0 | 0 | 1 | 0 |
| 4 | 4 | 0 | 4 | 1 | 0 | 1 | 1 |
| 5 | 5 | 1 | 0 | 2 | 0 | 2 | 2 |
| 6 | 6 | 0 | 1 | 0 | 0 | 2 | 0 |
| 7 | 7 | 1 | 2 | 1 | 0 | 2 | 1 |
| 8 | 8 | 0 | 3 | 2 | 0 | 2 | 2 |
| 9 | 9 | 1 | 4 | 0 | 0 | 3 | 0 |
| 10 | 10 | 0 | 0 | 1 | 0 | 3 | 1 |
| 11 | 11 | 1 | 1 | 2 | 0 | 3 | 2 |
| 12 | 12 | 0 | 2 | 0 | 0 | 4 | 0 |
| 13 | 13 | 1 | 3 | 1 | 0 | 4 | 1 |
| 14 | 14 | 0 | 4 | 2 | 0 | 4 | 2 |
| −15 | 15 | 1 | 0 | 0 | 1 | 0 | 0 |
| −14 | 16 | 0 | 1 | 1 | 1 | 0 | 1 |
| −13 | 17 | 1 | 2 | 2 | 1 | 0 | 2 |
| −12 | 18 | 0 | 3 | 0 | 1 | 1 | 0 |
| −11 | 19 | 1 | 4 | 1 | 1 | 1 | 1 |
| −10 | 20 | 0 | 0 | 2 | 1 | 1 | 2 |
| −9 | 21 | 1 | 1 | 0 | 1 | 2 | 0 |
| −8 | 22 | 0 | 2 | 1 | 1 | 2 | 1 |
| −7 | 23 | 1 | 3 | 2 | 1 | 2 | 2 |
| −6 | 24 | 0 | 4 | 0 | 1 | 3 | 0 |
| −5 | 25 | 1 | 0 | 1 | 1 | 3 | 1 |
| −4 | 26 | 0 | 1 | 2 | 1 | 3 | 2 |
| −3 | 27 | 1 | 2 | 0 | 1 | 4 | 0 |
| −2 | 28 | 0 | 3 | 1 | 1 | 4 | 1 |
| −1 | 29 | 1 | 4 | 2 | 1 | 4 | 2 |

| Decimal Number | Residue Number | | | | Mixed Base Number | | | |
|---|---|---|---|---|---|---|---|---|
| | $r_r$ ($m_r=7$) | $r_3$ ($m_3=5$) | $r_2$ ($m_2=3$) | $r_1$ ($m_1=2$) | $a_r$ | $a_3$ | $a_2$ | $a_1$ |
| 0 | 0 | 0 | 0 | 0 | 0 | 0 | 0 | 0 |
| 1 | 1 | 1 | 1 | 1 | 0 | 0 | 0 | 1 |
| 2 | 2 | 2 | 2 | 0 | 0 | 0 | 1 | 0 |
| 3 | 3 | 3 | 0 | 1 | 0 | 0 | 1 | 1 |
| 4 | 4 | 4 | 1 | 0 | 0 | 0 | 2 | 0 |
| 5 | 5 | 0 | 2 | 1 | 0 | 0 | 2 | 1 |
| 6 | 6 | 1 | 0 | 0 | 0 | 1 | 0 | 0 |
| 7 | 0 | 2 | 1 | 1 | 0 | 1 | 0 | 1 |
| 8 | 1 | 3 | 2 | 0 | 0 | 1 | 1 | 0 |
| 9 | 2 | 4 | 0 | 1 | 0 | 1 | 1 | 1 |
| 10 | 3 | 0 | 1 | 0 | 0 | 1 | 2 | 0 |
| 11 | 4 | 1 | 2 | 1 | 0 | 1 | 2 | 1 |
| 12 | 5 | 2 | 0 | 0 | 0 | 2 | 0 | 0 |
| 13 | 6 | 3 | 1 | 1 | 0 | 2 | 0 | 1 |
| 14 | 0 | 4 | 2 | 0 | 0 | 2 | 1 | 0 |
| 15 | 1 | 0 | 0 | 1 | 0 | 2 | 1 | 1 |
| 16 | 2 | 1 | 1 | 0 | 0 | 2 | 2 | 0 |
| 17 | 3 | 2 | 2 | 1 | 0 | 2 | 2 | 1 |
| 18 | 4 | 3 | 0 | 0 | 0 | 3 | 0 | 0 |
| 19 | 5 | 4 | 1 | 1 | 0 | 3 | 0 | 1 |
| 20 | 6 | 0 | 2 | 0 | 0 | 3 | 1 | 0 |
| 21 | 0 | 1 | 0 | 1 | 0 | 3 | 1 | 1 |
| 22 | 1 | 2 | 1 | 0 | 0 | 3 | 2 | 0 |
| 23 | 2 | 3 | 2 | 1 | 0 | 3 | 2 | 1 |
| 24 | 3 | 4 | 0 | 0 | 0 | 4 | 0 | 0 |
| 25 | 4 | 0 | 1 | 1 | 0 | 4 | 0 | 1 |
| 26 | 5 | 1 | 2 | 0 | 0 | 4 | 1 | 0 |
| 27 | 6 | 2 | 0 | 1 | 0 | 4 | 1 | 1 |
| 28 | 0 | 3 | 1 | 0 | 0 | 4 | 2 | 0 |
| 29 | 1 | 4 | 2 | 1 | 0 | 4 | 2 | 1 |
| 30 | 2 | 0 | 0 | 0 | 1 | 0 | 0 | 0 |
| 31 | 3 | 1 | 1 | 1 | 1 | 0 | 0 | 1 |
| 32 | 4 | 2 | 2 | 0 | 1 | 0 | 1 | 0 |
| 33 | 5 | 3 | 0 | 1 | 1 | 0 | 1 | 1 |
| 34 | 6 | 4 | 1 | 0 | 1 | 0 | 2 | 0 |
| 35 | 0 | 0 | 2 | 1 | 1 | 0 | 2 | 1 |
| 36 | 1 | 1 | 0 | 0 | 1 | 1 | 0 | 0 |
| 37 | 2 | 2 | 1 | 1 | 1 | 1 | 0 | 1 |
| 38 | 3 | 3 | 2 | 0 | 1 | 1 | 1 | 0 |
| 39 | 4 | 4 | 0 | 1 | 1 | 1 | 1 | 1 |
| 40 | 5 | 0 | 1 | 0 | 1 | 1 | 2 | 0 |

| Decimal Number | Ring Position | Residue Number | | | | Mixed Base Number | | | |
|---|---|---|---|---|---|---|---|---|---|
| | | $r_r$ | $r_3$ | $r_2$ | $r_1$ | $a_r$ | $a_3$ | $a_2$ | $a_1$ |
| | | ($m_r=7$) | ($m_3=2$) | ($m_2=5$) | ($m_1=3$) | | | | |
| −20 | 190 | 1 | 0 | 0 | 1 | 6 | 0 | 3 | 1 |
| −19 | 191 | 2 | 1 | 1 | 2 | 6 | 0 | 3 | 2 |
| −18 | 192 | 3 | 0 | 2 | 0 | 6 | 0 | 4 | 0 |
| −17 | 193 | 4 | 1 | 3 | 1 | 6 | 0 | 4 | 1 |
| −16 | 194 | 5 | 0 | 4 | 2 | 6 | 0 | 4 | 2 |
| −15 | 195 | 6 | 1 | 0 | 0 | 6 | 1 | 0 | 0 |
| −14 | 196 | 0 | 0 | 1 | 1 | 6 | 1 | 0 | 1 |
| −13 | 197 | 1 | 1 | 2 | 2 | 6 | 1 | 0 | 2 |
| −12 | 198 | 2 | 0 | 3 | 0 | 6 | 1 | 1 | 0 |
| −11 | 199 | 3 | 1 | 4 | 1 | 6 | 1 | 1 | 1 |
| −10 | 200 | 4 | 0 | 0 | 2 | 6 | 1 | 1 | 2 |
| −9 | 201 | 5 | 1 | 1 | 0 | 6 | 1 | 2 | 0 |
| −8 | 202 | 6 | 0 | 2 | 1 | 6 | 1 | 2 | 1 |
| −7 | 203 | 0 | 1 | 3 | 2 | 6 | 1 | 2 | 2 |
| −6 | 204 | 1 | 0 | 4 | 0 | 6 | 1 | 3 | 0 |
| −5 | 205 | 2 | 1 | 0 | 1 | 6 | 1 | 3 | 1 |
| −4 | 206 | 3 | 0 | 1 | 2 | 6 | 1 | 3 | 2 |
| −3 | 207 | 4 | 1 | 2 | 0 | 6 | 1 | 4 | 0 |
| −2 | 208 | 5 | 0 | 3 | 1 | 6 | 1 | 4 | 1 |
| −1 | 209 | 6 | 1 | 4 | 2 | 6 | 1 | 4 | 2 |
| 0 | 0 | 0 | 0 | 0 | 0 | 0 | 0 | 0 | 0 |
| 1 | 1 | 1 | 1 | 1 | 1 | 0 | 0 | 0 | 1 |
| 2 | 2 | 2 | 0 | 2 | 2 | 0 | 0 | 0 | 2 |
| 3 | 3 | 3 | 1 | 3 | 0 | 0 | 0 | 1 | 0 |
| 4 | 4 | 4 | 0 | 4 | 1 | 0 | 0 | 1 | 1 |
| 5 | 5 | 5 | 1 | 0 | 2 | 0 | 0 | 1 | 2 |
| 6 | 6 | 6 | 0 | 1 | 0 | 0 | 0 | 2 | 0 |
| 7 | 7 | 0 | 1 | 2 | 1 | 0 | 0 | 2 | 1 |
| 8 | 8 | 1 | 0 | 3 | 2 | 0 | 0 | 2 | 2 |
| 9 | 9 | 2 | 1 | 4 | 0 | 0 | 0 | 3 | 0 |
| 10 | 10 | 3 | 0 | 0 | 1 | 0 | 0 | 3 | 1 |
| 11 | 11 | 4 | 1 | 1 | 2 | 0 | 0 | 3 | 2 |
| 12 | 12 | 5 | 0 | 2 | 0 | 0 | 0 | 4 | 0 |
| 13 | 13 | 6 | 1 | 3 | 1 | 0 | 0 | 4 | 1 |
| 14 | 14 | 0 | 0 | 4 | 2 | 0 | 0 | 4 | 2 |
| 15 | 15 | 1 | 1 | 0 | 0 | 0 | 1 | 0 | 0 |
| 16 | 16 | 2 | 0 | 1 | 1 | 0 | 1 | 0 | 1 |
| 17 | 17 | 3 | 1 | 2 | 2 | 0 | 1 | 0 | 2 |
| 18 | 18 | 4 | 0 | 3 | 0 | 0 | 1 | 1 | 0 |
| 19 | 19 | 5 | 1 | 4 | 1 | 0 | 1 | 1 | 1 |
| 20 | 20 | 6 | 0 | 0 | 2 | 0 | 1 | 1 | 2 |

FIG. 8

| Decimal Number | Ring Position | Residue Number | | | Mixed Base Number | | |
|---|---|---|---|---|---|---|---|
| | | $r_3$ ($m_3=7$) | $r_2$ ($m_2=5$) | $r_1$ ($m_1=3$) | $a_3$ | $a_2$ | $a_1$ |
| -20 | 85 | 1 | 0 | 1 | 5 | 3 | 1 |
| -19 | 86 | 2 | 1 | 2 | 5 | 3 | 2 |
| -18 | 87 | 3 | 2 | 0 | 5 | 4 | 0 |
| -17 | 88 | 4 | 3 | 1 | 5 | 4 | 1 |
| -16 | 89 | 5 | 4 | 2 | 5 | 4 | 2 |
| -15 | 90 | 6 | 0 | 0 | 6 | 0 | 0 |
| -14 | 91 | 0 | 1 | 1 | 6 | 0 | 1 |
| -13 | 92 | 1 | 2 | 2 | 6 | 0 | 2 |
| -12 | 93 | 2 | 3 | 0 | 6 | 1 | 0 |
| -11 | 94 | 3 | 4 | 1 | 6 | 1 | 1 |
| -10 | 95 | 4 | 0 | 2 | 6 | 1 | 2 |
| -9 | 96 | 5 | 1 | 0 | 6 | 2 | 0 |
| -8 | 97 | 6 | 2 | 1 | 6 | 2 | 1 |
| -7 | 98 | 0 | 3 | 2 | 6 | 2 | 2 |
| -6 | 99 | 1 | 4 | 0 | 6 | 3 | 0 |
| -5 | 100 | 2 | 0 | 1 | 6 | 3 | 1 |
| -4 | 101 | 3 | 1 | 2 | 6 | 3 | 2 |
| -3 | 102 | 4 | 2 | 0 | 6 | 4 | 0 |
| -2 | 103 | 5 | 3 | 1 | 6 | 4 | 1 |
| -1 | 104 | 6 | 4 | 2 | 6 | 4 | 2 |
| 0 | 0 | 0 | 0 | 0 | 0 | 0 | 0 |
| 1 | 1 | 1 | 1 | 1 | 0 | 0 | 1 |
| 2 | 2 | 2 | 2 | 2 | 0 | 0 | 2 |
| 3 | 3 | 3 | 3 | 0 | 0 | 1 | 0 |
| 4 | 4 | 4 | 4 | 1 | 0 | 1 | 1 |
| 5 | 5 | 5 | 0 | 2 | 0 | 1 | 2 |
| 6 | 6 | 6 | 1 | 0 | 0 | 2 | 0 |
| 7 | 7 | 0 | 2 | 1 | 0 | 2 | 1 |
| 8 | 8 | 1 | 3 | 2 | 0 | 2 | 2 |
| 9 | 9 | 2 | 4 | 0 | 0 | 3 | 0 |
| 10 | 10 | 3 | 0 | 1 | 0 | 3 | 1 |
| 11 | 11 | 4 | 1 | 2 | 0 | 3 | 2 |
| 12 | 12 | 5 | 2 | 0 | 0 | 4 | 0 |
| 13 | 13 | 6 | 3 | 1 | 0 | 4 | 1 |
| 14 | 14 | 0 | 4 | 2 | 0 | 4 | 2 |
| 15 | 15 | 1 | 0 | 0 | 1 | 0 | 0 |
| 16 | 16 | 2 | 1 | 1 | 1 | 0 | 1 |
| 17 | 17 | 3 | 2 | 2 | 1 | 0 | 2 |
| 18 | 18 | 4 | 3 | 0 | 1 | 1 | 0 |
| 19 | 19 | 5 | 4 | 1 | 1 | 1 | 1 |
| 20 | 20 | 6 | 0 | 2 | 1 | 1 | 2 |

FIG. 9

| Decimal Number | Non-redundant Ring Position | Moduli $m_3$ $m_2$ $m_1$ 2 5 3 Mixed Base Digits (X) $a_3$ $a_2$ $a_1$ | | | x | Moduli $m_3$ $m_2$ $m_1$ 2 3 5 Mixed Base Digits (Y) $b_3$ $b_1$ $b_2$ | | | y | Redundant Ring Position | Moduli $m_3$ $m_2$ $m_1$ 7 5 3 Mixed Base Digits (XY) $c_3$ $c_2$ $c_1$ | | |
|---|---|---|---|---|---|---|---|---|---|---|---|---|---|
| -20 | | | | | | | | | | 85 | 5 | 3 | 1 |
| -19 | | | | | | | | | | 86 | 5 | 3 | 2 |
| -18 | | | | | | | | | | 87 | 5 | 4 | 0 |
| -17 | | | | | | | | | | 88 | 5 | 4 | 1 |
| -16 | | | | | | | | | | 89 | 5 | 4 | 2 |
| -15 | 15 | 1 | 0 | 0 | 2 | 1 | 0 | 0 | 1 | 90 | 6 | 0 | 0 |
| -14 | 16 | 1 | 0 | 1 | 2 | 1 | 0 | 1 | 1 | 91 | 6 | 0 | 1 |
| -13 | 17 | 1 | 0 | 2 | 2 | 1 | 0 | 2 | 1 | 92 | 6 | 0 | 2 |
| -12 | 18 | 1 | 1 | 0 | 2 | 1 | 0 | 3 | 1 | 93 | 6 | 1 | 0 |
| -11 | 19 | 1 | 1 | 1 | 2 | 1 | 0 | 4 | 1 | 94 | 6 | 1 | 1 |
| -10 | 20 | 1 | 1 | 2 | 2 | 1 | 1 | 0 | 1 | 95 | 6 | 1 | 2 |
| -9 | 21 | 1 | 2 | 0 | 2 | 1 | 1 | 1 | 1 | 96 | 6 | 2 | 0 |
| -8 | 22 | 1 | 2 | 1 | 2 | 1 | 1 | 2 | 1 | 97 | 6 | 2 | 1 |
| -7 | 23 | 1 | 2 | 2 | 2 | 1 | 1 | 3 | 1 | 98 | 6 | 2 | 2 |
| -6 | 24 | 1 | 3 | 0 | 2 | 1 | 1 | 4 | 1 | 99 | 6 | 3 | 0 |
| -5 | 25 | 1 | 3 | 1 | 2 | 1 | 2 | 0 | 2 | 100 | 6 | 3 | 1 |
| -4 | 26 | 1 | 3 | 2 | 2 | 1 | 2 | 1 | 2 | 101 | 6 | 3 | 2 |
| -3 | 27 | 1 | 4 | 0 | 1 | 1 | 2 | 2 | 2 | 102 | 6 | 4 | 0 |
| -2 | 28 | 1 | 4 | 1 | 1 | 1 | 2 | 3 | 2 | 103 | 6 | 4 | 1 |
| -1 | 29 | 1 | 4 | 2 | 1 | 1 | 2 | 4 | 2 | 104 | 6 | 4 | 2 |
| 0 | 0 | 0 | 0 | 0 | 1 | 0 | 0 | 0 | 2 | 0 | 0 | 0 | 0 |
| 1 | 1 | 0 | 0 | 1 | 1 | 0 | 0 | 1 | 2 | 1 | 0 | 0 | 1 |
| 2 | 2 | 0 | 0 | 2 | 1 | 0 | 0 | 2 | 2 | 2 | 0 | 0 | 2 |
| 3 | 3 | 0 | 1 | 0 | 2 | 0 | 0 | 3 | 2 | 3 | 0 | 1 | 0 |
| 4 | 4 | 0 | 1 | 1 | 2 | 0 | 0 | 4 | 2 | 4 | 0 | 1 | 1 |
| 5 | 5 | 0 | 1 | 2 | 2 | 0 | 1 | 0 | 1 | 5 | 0 | 1 | 2 |
| 6 | 6 | 0 | 2 | 0 | 2 | 0 | 1 | 1 | 1 | 6 | 0 | 2 | 0 |
| 7 | 7 | 0 | 2 | 1 | 2 | 0 | 1 | 2 | 1 | 7 | 0 | 2 | 1 |
| 8 | 8 | 0 | 2 | 2 | 2 | 0 | 1 | 3 | 1 | 8 | 0 | 2 | 2 |
| 9 | 9 | 0 | 3 | 0 | 2 | 0 | 1 | 4 | 1 | 9 | 0 | 3 | 0 |
| 10 | 10 | 0 | 3 | 1 | 2 | 0 | 2 | 0 | 1 | 10 | 0 | 3 | 1 |
| 11 | 11 | 0 | 3 | 2 | 2 | 0 | 2 | 1 | 1 | 11 | 0 | 3 | 2 |
| 12 | 12 | 0 | 4 | 0 | 2 | 0 | 2 | 2 | 1 | 12 | 0 | 4 | 0 |
| 13 | 13 | 0 | 4 | 1 | 2 | 0 | 2 | 3 | 1 | 13 | 0 | 4 | 1 |
| 14 | 14 | 0 | 4 | 2 | 2 | 0 | 2 | 4 | 1 | 14 | 0 | 4 | 2 |
| 15 | | | | | | | | | | 15 | 1 | 0 | 0 |
| 16 | | | | | | | | | | 16 | 1 | 0 | 1 |
| 17 | | | | | | | | | | 17 | 1 | 0 | 2 |
| 18 | | | | | | | | | | 18 | 1 | 1 | 0 |
| 19 | | | | | | | | | | 19 | 1 | 1 | 1 |

FIG.10

| Decimal Number | Moduli $m_3=5, m_2=3, m_1=2$ Mixed Base Digits (X) | | | | Moduli $m_3=2, m_2=3, m_1=5$ Mixed Base Digits (Y) | | | | Moduli $m_r=7, m_3=5, m_2=3, m_1=2$ Mixed Base Digits (XY) | | | |
|---|---|---|---|---|---|---|---|---|---|---|---|---|
| | $a_3$ | $a_2$ | $a_1$ | x | $b_1$ | $b_2$ | $b_3$ | y | $c_r$ | $c_3$ | $c_2$ | $c_1$ |
| 0  | 0 | 0 | 0 | 1 | 0 | 0 | 0 | 3 | 0 | 0 | 0 | 0 |
| 1  | 0 | 0 | 1 | 1 | 0 | 0 | 1 | 3 | 0 | 0 | 0 | 1 |
| 2  | 0 | 1 | 0 | 2 | 0 | 0 | 2 | 3 | 0 | 0 | 1 | 0 |
| 3  | 0 | 1 | 1 | 2 | 0 | 0 | 3 | 3 | 0 | 0 | 1 | 1 |
| 4  | 0 | 2 | 0 | 2 | 0 | 0 | 4 | 3 | 0 | 0 | 2 | 0 |
| 5  | 0 | 2 | 1 | 2 | 0 | 1 | 0 | 2 | 0 | 0 | 2 | 1 |
| 6  | 1 | 0 | 0 | 3 | 0 | 1 | 1 | 2 | 0 | 1 | 0 | 0 |
| 7  | 1 | 0 | 1 | 3 | 0 | 1 | 2 | 2 | 0 | 1 | 0 | 1 |
| 8  | 1 | 1 | 0 | 3 | 0 | 1 | 3 | 2 | 0 | 1 | 1 | 0 |
| 9  | 1 | 1 | 1 | 3 | 0 | 1 | 4 | 2 | 0 | 1 | 1 | 1 |
| 10 | 1 | 2 | 0 | 3 | 0 | 2 | 0 | 2 | 0 | 1 | 2 | 0 |
| 11 | 1 | 2 | 1 | 3 | 0 | 2 | 1 | 2 | 0 | 1 | 2 | 1 |
| 12 | 2 | 0 | 0 | 3 | 0 | 2 | 2 | 2 | 0 | 2 | 0 | 0 |
| 13 | 2 | 0 | 1 | 3 | 0 | 2 | 3 | 2 | 0 | 2 | 0 | 1 |
| 14 | 2 | 1 | 0 | 3 | 0 | 2 | 4 | 2 | 0 | 2 | 1 | 0 |
| 15 | 2 | 1 | 1 | 3 | 1 | 0 | 0 | 1 | 0 | 2 | 1 | 1 |
| 16 | 2 | 2 | 0 | 3 | 1 | 0 | 1 | 1 | 0 | 2 | 2 | 0 |
| 17 | 2 | 2 | 1 | 3 | 1 | 0 | 2 | 1 | 0 | 2 | 2 | 1 |
| 18 | 3 | 0 | 0 | 3 | 1 | 0 | 3 | 1 | 0 | 3 | 0 | 0 |
| 19 | 3 | 0 | 1 | 3 | 1 | 0 | 4 | 1 | 0 | 3 | 0 | 1 |
| 20 | 3 | 1 | 0 | 3 | 1 | 1 | 0 | 1 | 0 | 3 | 1 | 0 |
| 21 | 3 | 1 | 1 | 3 | 1 | 1 | 1 | 1 | 0 | 3 | 1 | 1 |
| 22 | 3 | 2 | 0 | 3 | 1 | 1 | 2 | 1 | 0 | 3 | 2 | 0 |
| 23 | 3 | 2 | 1 | 3 | 1 | 1 | 3 | 1 | 0 | 3 | 2 | 1 |
| 24 | 4 | 0 | 0 | 3 | 1 | 1 | 4 | 1 | 0 | 4 | 0 | 0 |
| 25 | 4 | 0 | 1 | 3 | 1 | 2 | 0 | 1 | 0 | 4 | 0 | 1 |
| 26 | 4 | 1 | 0 | 3 | 1 | 2 | 1 | 1 | 0 | 4 | 1 | 0 |
| 27 | 4 | 1 | 1 | 3 | 1 | 2 | 2 | 1 | 0 | 4 | 1 | 1 |
| 28 | 4 | 2 | 0 | 3 | 1 | 2 | 3 | 1 | 0 | 4 | 2 | 0 |
| 29 | 4 | 2 | 1 | 3 | 1 | 2 | 4 | 1 | 0 | 4 | 2 | 1 |
| 30 |   |   |   |   |   |   |   |   | 1 | 0 | 0 | 0 |
| 31 |   |   |   |   |   |   |   |   | 1 | 0 | 0 | 1 |
| 32 |   |   |   |   |   |   |   |   | 1 | 0 | 1 | 0 |
| 33 |   |   |   |   |   |   |   |   | 1 | 0 | 1 | 1 |
| 34 |   |   |   |   |   |   |   |   | 1 | 0 | 2 | 0 |

FIG. 11

| Decimal Number | Redundant Ring Position | Moduli $m_3=7, m_2=5, m_1=3$ Mixed Base Digits (X) | | | | Moduli $m_3=7, m_2=3, m_1=5$ Mixed Base Digits (Y) | | | | Moduli $m_3=7, m_2=5, m_1=3$ Mixed Base Digits (XY) | | |
|---|---|---|---|---|---|---|---|---|---|---|---|---|
| | | $a_3$ | $a_2$ | $a_1$ | x | $b_3$ | $b_1$ | $b_2$ | y | $c_3$ | $c_2$ | $c_1$ |
| -20 | 85 | | | | | | | | | 5 | 3 | 1 |
| -19 | 86 | | | | | | | | | 5 | 3 | 2 |
| -18 | 87 | | | | | | | | | 5 | 4 | 0 |
| -17 | 88 | | | | | | | | | 5 | 4 | 1 |
| -16 | 89 | | | | | | | | | 5 | 4 | 2 |
| -15 | 90 | 6 | 0 | 0 | 2 | 6 | 0 | 0 | 1 | 6 | 0 | 0 |
| -14 | 91 | 6 | 0 | 1 | 2 | 6 | 0 | 1 | 1 | 6 | 0 | 1 |
| -13 | 92 | 6 | 0 | 2 | 2 | 6 | 0 | 2 | 1 | 6 | 0 | 2 |
| -12 | 93 | 6 | 1 | 0 | 2 | 6 | 0 | 3 | 1 | 6 | 1 | 0 |
| -11 | 94 | 6 | 1 | 1 | 2 | 6 | 0 | 4 | 1 | 6 | 1 | 1 |
| -10 | 95 | 6 | 1 | 2 | 2 | 6 | 1 | 0 | 1 | 6 | 1 | 2 |
| -9 | 96 | 6 | 2 | 0 | 2 | 6 | 1 | 1 | 1 | 6 | 2 | 0 |
| -8 | 97 | 6 | 2 | 1 | 2 | 6 | 1 | 2 | 1 | 6 | 2 | 1 |
| -7 | 98 | 6 | 2 | 2 | 2 | 6 | 1 | 3 | 1 | 6 | 2 | 2 |
| -6 | 99 | 6 | 3 | 0 | 2 | 6 | 1 | 4 | 1 | 6 | 3 | 0 |
| -5 | 100 | 6 | 3 | 1 | 2 | 6 | 2 | 0 | 2 | 6 | 3 | 1 |
| -4 | 101 | 6 | 3 | 2 | 2 | 6 | 2 | 1 | 2 | 6 | 3 | 2 |
| -3 | 102 | 6 | 4 | 0 | 1 | 6 | 2 | 2 | 2 | 6 | 4 | 0 |
| -2 | 103 | 6 | 4 | 1 | 1 | 6 | 2 | 3 | 2 | 6 | 4 | 1 |
| -1 | 104 | 6 | 4 | 2 | 1 | 6 | 2 | 4 | 2 | 6 | 4 | 2 |
| 0 | 0 | 0 | 0 | 0 | 1 | 0 | 0 | 0 | 2 | 0 | 0 | 0 |
| 1 | 1 | 0 | 0 | 1 | 1 | 0 | 0 | 1 | 2 | 0 | 0 | 1 |
| 2 | 2 | 0 | 0 | 2 | 1 | 0 | 0 | 2 | 2 | 0 | 0 | 2 |
| 3 | 3 | 0 | 1 | 0 | 2 | 0 | 0 | 3 | 2 | 0 | 1 | 0 |
| 4 | 4 | 0 | 1 | 1 | 2 | 0 | 0 | 4 | 2 | 0 | 1 | 1 |
| 5 | 5 | 0 | 1 | 2 | 2 | 0 | 1 | 0 | 1 | 0 | 1 | 2 |
| 6 | 6 | 0 | 2 | 0 | 2 | 0 | 1 | 1 | 1 | 0 | 2 | 0 |
| 7 | 7 | 0 | 2 | 1 | 2 | 0 | 1 | 2 | 1 | 0 | 2 | 1 |
| 8 | 8 | 0 | 2 | 2 | 2 | 0 | 1 | 3 | 1 | 0 | 2 | 2 |
| 9 | 9 | 0 | 3 | 0 | 2 | 0 | 1 | 4 | 1 | 0 | 3 | 0 |
| 10 | 10 | 0 | 3 | 1 | 2 | 0 | 2 | 0 | 1 | 0 | 3 | 1 |
| 11 | 11 | 0 | 3 | 2 | 2 | 0 | 2 | 1 | 1 | 0 | 3 | 2 |
| 12 | 12 | 0 | 4 | 0 | 2 | 0 | 2 | 2 | 1 | 0 | 4 | 0 |
| 13 | 13 | 0 | 4 | 1 | 2 | 0 | 2 | 3 | 1 | 0 | 4 | 1 |
| 14 | 14 | 0 | 4 | 2 | 2 | 0 | 2 | 4 | 1 | 0 | 4 | 2 |
| 15 | 15 | | | | | | | | | 1 | 0 | 0 |
| 16 | 16 | | | | | | | | | 1 | 0 | 1 |
| 17 | 17 | | | | | | | | | 1 | 0 | 2 |
| 18 | 18 | | | | | | | | | 1 | 1 | 0 |
| 19 | 19 | | | | | | | | | 1 | 1 | 1 |

FIG.12

|   | x | 0 | 1 | 2 | 3 |
|---|---|---|---|---|---|
| y |   |   |   |   |   |
| 0 |   | = | > | > | > |
| 1 |   | < | = | > | > |
| 2 |   | < | < | = | > |
| 3 |   | < | < | < | = |

FIG. 18a

|   | x | 0 | 1 | 2 | 3 |
|---|---|---|---|---|---|
| y |   |   |   |   |   |
| 3 |   | < | < | < | = |
| 2 |   | < | < | = | > |
| 1 |   | < | = | > | > |
| 0 |   | = | > | > | > |

FIG. 18b

METHOD AND APPARATUS FOR PIPELINED DETECTION OF OVERFLOW IN RESIDUE ARITHMETIC MULTIPLICATION

BACKGROUND OF THE INVENTION

The invention is in the field of information processing. Specifically, the invention relates to the detection of overflow in residue number system (RNS) multiplication operations.

The RNS has received considerable attention in recent times as an effective tool for performing single step, parallel computation of sums, differences, and products. A system employing the RNS may be used for high speed, real time, parallel processing of data.

A difficulty associated with actually achieving fast computation with the RNS is that a RNS representation of a number does not provide explicit sign and magnitude information. The lack of explicit sign and magnitude information hinders overflow detection. *Residue Arithmetic and Its Application to Computer Technology*, N.S. Szabo and R.I. Tanaka, (McGraw Hill, New York, 1967), and "Residue Arithmetic: A Tutorial with Examples," F.J. Taylor Computer Vol. 17, No. 5, pp. 50-62 (May 1984), both incorporated by reference, provide general background information on the RNS and the mixed base number system, to be discussed below.

Optical information processors which are ideally suited to perform the parallel computations required in RNS arithmetic are currently under development. There are fundamental differences between optical processors based on optical circuits in which the information carriers are photons and electronic processors based on electronic circuits in which the information carriers are electrons. In optical circuits the photon carriers do not interact with one another, while in electronic circuits the electron carriers do interact with one another. This fact means that in optical circuits interconnect possibilities exist that do not exist with electronic circuits. In particular, optical circuits allow parallel architectures which perform arithmetic and logical operations in completely parallel, single step processes. Since the speed of optical devices is essentially limited to the time it takes for a photon to transit a device, no faster computation time is possible.

The capability to detect overflow is a fundamental requirement of any general purpose computer whether the computer is optical or electronic. A slow overflow detection system slows the speed of the entire computational process. Thus, in order to provide an efficient optical processor based on RNS arithmetic, it is desirable to develop an RNS overflow detection capability which does not rely on explicit sign and magnitude information.

U.S. Pat. No. 4,121,298 entitled "Central Processing Unit for Numbers Represented in the System of Residual Classes," issued to Akushsky et al, discloses a RNS computer which detects overflow via a position attribute, or core function. Use of the core function has the disadvantage that the core function is not necessarily monotonically increasing and therefore can produce somewhat ambiguous magnitude results. The invention disclosed in the '298 patent also requires time consuming feedback and iteration. In addition, a time consuming sequential division algorithm is employed in the '298 patent. Since the sequential division algorithm does not have a fixed length, the '298 system can not be used in conjunction with a pipelined system. The '298 patent is not designed to be used in conjunction with optical circuitry. Thus, the '298 device is not suitable for use for overflow detection in a high speed optical computer.

U.S. Pat. No. 4,064,400 entitled "Device For Multiplying Numbers in a System of Residual Classes," issued to Akushsky et al discloses a fully electronic RNS multiplier which detects overflow resulting from multiplication. The device disclosed in the '400 patent operates internally in binary. The multiplier is converted from its RNS representation to a binary fraction and an order of magnitude indicator is used for overflow detection. The binary fraction bits are used serially to perform Russian Multiplication Theorem operations on the multiplicand using RNS arithmetic. The serial use of the binary fraction bits in the '400 patent is time consuming. In addition, the magnitude indicator used in the '400 patent has disadvantages similar to those described above with respect to the core function used in the '298 patent. The electronic circuits employed by the device disclosed in the '400 patent are slower than optical circuits. Thus, the device disclosed in the '400 patent could not be used in an optical computer without significantly decreasing the overall speed of the optical computer.

Accordingly, there is a need for a high speed RNS multiplication overflow detection processor which can be effectively used in an optical computer.

SUMMARY OF THE INVENTION

It is an object of the invention, therefore, to provide a high speed RNS multiplication overflow detection processor.

Another object of the invention is to provide a RNS multiplication overflow detection processor which uses optical technologies to realize an efficient overflow detection processor and which can be efficiently used in conjunction with other optical processing elements.

Another object of the invention is to provide a RNS multiplication overflow detection processor which processes inputs in a pipelined fashion.

A further object of the invention is to provide a RNS multiplication overflow detection processor which unambiguously detects overflow.

A further object of the invention is to provide a RNS multiplication overflow detection processor which performs more than one overflow detection test in parallel in order to achieve a high speed overflow detection process.

According to a first aspect of the invention there is provided an overflow detection processor which detects whether or not multiplicative overflow has occurred during multiplication of a first operand and a second operand expressed in redundant representation of a residue number system. The overflow detection processor comprises first, second and third mixed base converters, a multiplier, a most significant digits detector and a logic circuit. The first mixed base converter is connected for receiving the first operand and converting the first operand into a first set of mixed base digits. The second mixed base converter is connected for receiving the second operand, in parallel to the first mixed base converter, and converting the second operand into a second set of mixed base digits. The multiplier is connected for receiving the first and second operands and multiplying the first and second operands to produce a product. The most significant digits detector is connected to receive the first and second sets of mixed base digits and calculates a first magnitude measure of the first set of mixed base digits and a second magnitude measure of the second set of mixed base digits. The detector generates first signals indicative of a relationship between the first magnitude measure and the second magnitude measure. The third mixed base converter is connected for receiving the product from the multiplier and is operable independently of results of the most significant digits detector. The third mixed base convertor converts the product into a third set of mixed base digits. Finally, the logic circuit is connected for receiving the first signals, and second signals based on the third set of mixed base digits. The logic circuit generates a validity signal indicative of whether or not multiplicative overflow has occurred.

According to another aspect of the invention, there is provided a method of detecting multiplicative overflow, comprising the steps of:

(a) converting first signals representative of a first operand in residue representation into third signals representative of the first operand in mixed base representation;

(b) converting second signals representative of a second operand in residue representation into fourth signals representative of the second operand in mixed base representation;

(c) multiplying the first signals and the second signals to produce product signals;

(d) generating a most significant digits signal indicative of whether or not a first magnitude measure associated with the third signals is greater than a second magnitude measure associated with the fourth signals;

(e) generating fifth signals independently of results of step (d), the fifth signals corresponding to a mixed base representation of the product signals; and (f) subsequent to steps (a) through (e), transmitting a validity signal indicating whether or not multiplicative overflow has occurred based on the most significant digits signal and the fifth signal.

BRIEF DESCRIPTION OF THE DRAWINGS

The invention is described below with reference to the accompanying drawings, wherein:

FIG. 1 is a table illustrating decimal, residue, and mixed base representations of the decimal numbers 0 through 29;

FIG. 4 is a table illustrating decimal, residue, and mixed base representations of the decimal numbers 15 to 14;

FIG. 6 is a table illustrating decimal, residue, and mixed base representations of the decimal numbers —15 to 14 in which the third mixed base digit indicates the sign of the number;

FIG. 7 is a table illustrating decimal, residue, and mixed base representations in a redundant RNS;

FIG. 8 is a table illustrating decimal, residue, and mixed base representations in a redundant RNS where the left-most non-redundant modulus is 2;

FIG. 9 is a table illustrating decimal, residue, and mixed base representations of another RNS;

FIG. 10 is a table illustrating mixed base representations of two non-negative or negative operands;

FIG. 11 is a table illustrating mixed base representations of two non-negative operands;

FIG. 12 is a table illustrating mixed base representations of two operands represented in redundant representation;

FIGS. 18($a$) and 18$b$) list logic tables for the modulo 4 comparator of FIG. 17;

DETAILED DESCRIPTION OF THE PREFERRED EMBODIMENTS

Figures 2, 3:
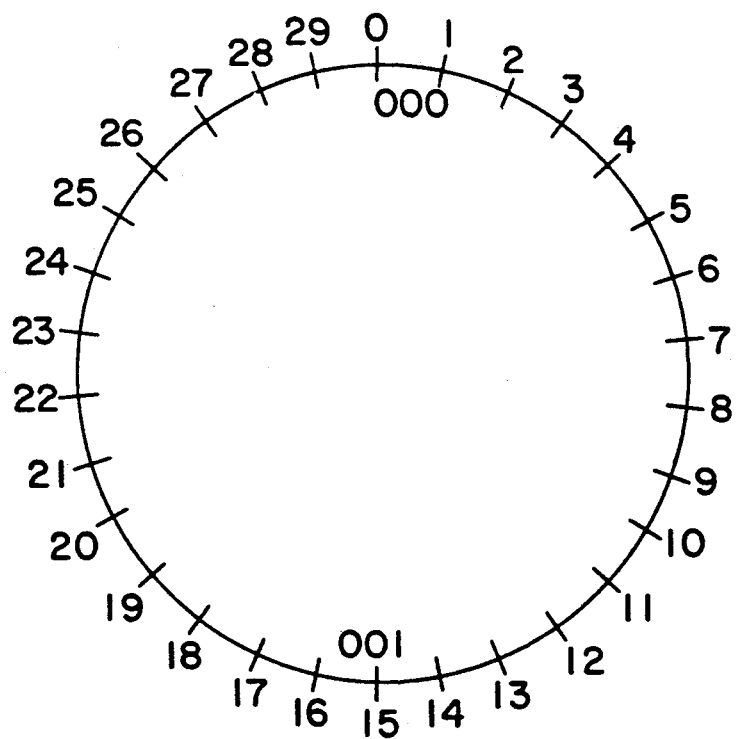
FIG. 2 illustrates an example of overflow occurring in RNS multiplication.
FIG. 3 illustrates the RNS ring associated with FIG. 1.

The overflow detection processor according to the invention can be used in conjunction with other optical processing systems, such as those disclosed in U.S. Pat. No. 4,797,843. issued Jan. 10, 1989, entitled "Parallel Optical Arithmetic/Logic Unit;" and in co-pending applications Ser. No. 07/019,761, filed Feb. 27, 1987, entitled "Optical Cross Bar Arithmetic/Logic Unit;" Ser. No. 07/219,392, filed July 15, 1988, entitled "Optical Computer Including Pipelined Conversion of Numbers to Residue Representation;" Ser. No. 07/233,610, filed Aug. 18, 1988, entitled "Optical Computer Including Parallel Residue to Binary Conversion;" co-pending application Ser. No. 414,276, filed Sept. 29, 1989, entitled "Residue Addition Overflow Detection Processor" by T.L. Houk ; co-pending application Ser. No. 07/414,474 filed Sept. 29, 1989, entitled "Parallel Residue to Mixed Base Converter" by R.A. Falk ; and copending application Ser. No. 07/414,019, filed Sept. 29, 1989, entitled "Pipelined Residue to Mixed Base Converter and Base Extension Processor" by T.L. Houk and R.A. Falk all incorporated herein by reference.

RESIDUE AND MIXED BASE NUMBER THEORY

An integer is represented in the RNS by writing down an n-tuple where the $i^{th}$ digit is the remainder, $r_i$, after division of the integer by an associated modulus, $m_i$. FIG. 1 lists RNS representations of the decimal numbers 0 to 29, when the moduli are 2, 3, and 5. For example, the decimal number 7 is represented as 211 in RNS representation. If the moduli are chosen to be mutually prime, then all integers within the range of zero to the product of the moduli minus one can be uniquely represented.

The importance of the residue number system to numerical processing is that the operations of addition, subtraction, and multiplication can be performed without the use of carry operations between the moduli. In other words, each digit in the n-tuple can be operated on independently and in parallel For example, if n-tuples X, having digits $x_1 \ldots x_n$, and Y, having digits $y_1 \ldots y_n$, are multiplied to produce Z, having digits $z_1 \ldots z_n$, then the $i^{th}$ digit is given by:

$$z_i = (x_i \cdot y_i) \bmod m_i \quad (1)$$

The mod function takes the number in front of "mod," in this case $x_i \cdot y_i$, and divides this number by the number after "mod," in this case $m_i$, and substitutes the remainder for the entire function.

The power of RNS representation is that an operation on large numbers can be broken down into small parallel modular operations. For example, a sixteen bit binary number can be represented in a residue number system using the five moduli 5, 7, 11, 13 and 17. Multiplication of two 16 bit binary numbers produces a 32 bit intermediate result and requires 31 carry operations. In contrast, modular arithmetic devices can perform the same multiplication operation in one step per modulus, all steps being performed simultaneously in parallel.

The high speed potential of RNS arithmetic may be effectively exploited by optical computers that excel at parallel operations. Optical computers making use of RNS arithmetic promise at least an order of magnitude improvement in computational speed over standard electronic, binary computers.

A difficulty with the RNS representation is that magnitude comparisons can not be determined by a simple one-to-one digit comparison. For example, as seen from FIG. 1, in RNS representation the decimal number 16, which is represented in RNS representation as 110, appears smaller than the decimal number 8, which is represented in RNS representation as 320. Another difficulty associated with RNS representation is that the occurrence of overflow resulting from multiplication operations can not be readily detected. For example, if decimal number 5, which is represented in RNS representation as 021, is multiplied by decimal number 7, which is represented in RNS representation as 211, the RNS result would be 021, as is illustrated in FIG. 2. In the range 0-29, the RNS representation 021 corresponds to decimal number 5. There is no way to determine by inspection that overflow has occurred and that the correct product is not 5. In order to implement a general purpose computer, multiplication overflow detection is required.

RNS representation and overflow can be illustrated by visualizing RNS representation as a ring such as depicted in FIG. 3. It is this periodic or ring property which complicates overflow detection in the RNS representation. If RNS representation is to be unambiguous in computation, a computational system must be implicitly restricted to a single range. There are only a finite number of positions in the RNS ring. In the example illustrated in FIG. 3, there are 30 finite positions. If each of these positions is occupied by one number within the range, the RNS forms a non-redundant redundant ring. A redundant RNS has more positions on the ring than unique numbers to be represented. If two large numbers within the range are multiplied, for example decimal 5 nd decimal 7, the product will be an overflow number which also corresponds to a number within the range, for example decimal number 5 represented in RNS as 021. A number within the predefined range is said to be "valid" while a number outside the predefined range is said to be "invalid". An analogous situation occurs in binary computers of fixed word length.

One method of obtaining overflow information involves mixed base representation. A number X may be expressed in mixed base form according to the following equations:

$$X = \sum_{j=1}^{N} a_j w_j \quad (2)$$

where:

$$w_j = \prod_{i=1}^{j-1} m_i \quad j \geq 2 \quad (3)$$
$$w_1 = 1 \quad j = 1$$

so that:

$$X = a_N \prod_{i=1}^{N-1} m_i + \ldots + a_3 m_1 m_2 + a_2 m_1 + a_1 \quad (4)$$

The terms $w_1, \ldots, w_j$ are the bases and are related to the moduli of an associated RNS representation. The terms $a_1, \ldots, a_N$ are the mixed base digits. From left to right, the mixed base digits are in descending order of significance. Any positive integer in the interval:

$$\left[ 0, \prod_{i=1}^{N} m_i - 1 \right]$$

may be represented in accordance with Equation (4), and each integer has a unique representation. FIG. 1 lists the mixed base digits for decimal numbers 0 through 29. In FIG. 1, $w_1$ is 1, $w_2$ is the modulus 2, and $w_3$ is 6, the product of the modulus 2 and the modulus 3. Thus the decimal number 10 is represented as 120, where $a_1$ is 0, $a_2$ is 2, and $a_3$ is 1.

A mixed base system can be arranged such that:

$$0 \leq a_j < m_j \quad (5)$$

resulting in the property that:

$$|w_{k+1}| > \left| \sum_{j=1}^{k} a_j w_j \right| \quad (6)$$

The arrangement of Equation (5) results in an ordered sequencing of the mixed base digits. As can be seen from Equation (6), this ordered sequencing allows direct magnitude determination by a comparison of the digits. For example, the mixed base number 220, decimal number 16, can be readily determined to be greater than the mixed base number 110, decimal number 8, since the most significant digit of 220 is greater than the most significant digit of 110.

Figure 5:
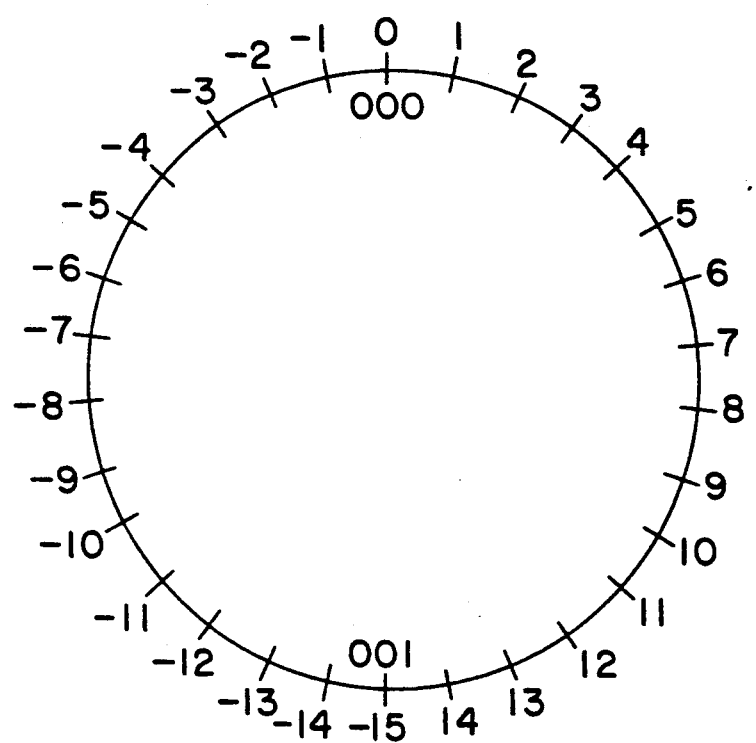
FIG. 5 illustrates the RNS ring associated with FIG. 4.

Negative numbers may also be implicitly represented in RNS representation. For example, FIG. 4 illustrates how the integers from −15 to 14 may be represented in RNS form. FIG. 5 illustrates the ring corresponding to FIG. 4.

Although RNS arithmetic involving negative numbers can be performed by forming a correspondence table between the negative numbers and associated positive numbers and performing intermediate computation using positive number RNS, it is frequently more useful to treat negative-and-positive-number RNS in a more direct fashion, as illustrated in FIG. 6. In FIG. 6, the order of the RNS digits is arranged such that the $m_3$ modulus is 2. The other moduli, 5 and 3, are arranged in descending order from left to right as $m_2$ and $m_1$ respectively. The mixed base weights for this new order are computed in accordance with Equation (3) and mixed base digits $a_3$, $a_2$, and $a_1$ are tabulated as shown in FIG. 6. FIG. 6 shows that $a_3$ can be used to determine whether an associated RNS number is positive or negative. That is, $a_3$ is zero for all non-negative numbers and 1 for all negative numbers. As will be described in further detail later, the invention makes use of both RNS and mixed base representations to detect overflow.

A non-redundant RNS can be made redundant by the use of an additional, redundant modulus $m_r$. An overflow detection processor which employs an additional modulus enlarges the ring to a size to which overflow would not occur, performs the multiplication, and determines whether or not the product is within the valid range of the original non-redundant ring. In the alternative, the ring can be chosen to be redundant and the range of valid numbers could be limited to leave room for overflow detection. Adding redundancy is also a recognized way of identifying failed computational channels and of providing for graceful system degradation.

An aspect of the invention makes use of the enlargement method. If the new, redundant modulus $m_r$ is prime relative to the original, non-redundant moduli $m_1, m_2, \ldots, m_N$, the enlarged ring circumference $M_r$ is the product of all these moduli, that is, $M_r = m_1 m_2 \ldots m_N m_r = m_r M$, where $M$ is the circumference of the original non-redundant ring. From Equation (4) above and the discussion immediately following it, it may be seen that ring positions (numbers) from $M$ to $M_r$ cannot be represented in mixed base form unless a new term $a_r w_r$ is included in the sum, where $w_r = M$ and $a_r$ lies in the closed interval 0 to $m_r - 1$. Accordingly, the general form of the mixed base expansion where a redundant modulus is adjoined to a non-redundant ring comprising $N$ moduli is:

$$X = a_r \prod_{i=1}^{N} m_i + a_N \prod_{i=1}^{N-1} m_i + \ldots a_2 m_1 + a_1 \qquad (7)$$

Two numerical examples of the enlargement method will be discussed first in order to better understand the hardware descriptions below. The first example enlarges the ring of non-negative numbers shown in FIGS. 1 and 3. The second example enlarges the ring of negative and non-negative numbers shown in FIG. 6 in such a way that the mixed base digits may be used for sign detection. In both examples, the additional, redundant modulus $m_r = 7$ is chosen because 7 is prime relative to the other moduli 2, 3, and 5. Choosing a relative prime additional modulus ensures that mixed base digit computations and base extension, to be discussed further below, are possible.

FIG. 7 shows the first enlargement example. The enlarged, redundant ring circumference is the product of 2, 3, 5, and 7, or 210. In FIG. 7, decimal numbers 41 through 209 are omitted for brevity. Representations are valid in the range 0 to 29 inclusive and are invalid in the range 30 to 209 inclusive. Validity can be determined by converting a number from RNS representation into mixed base representation and examining the fourth mixed base digit $a_r$. This fourth mixed base digit $a_r$ is zero for valid numbers and is non-zero for invalid numbers. The use of the $a_r$ digit as a validity indicator, and thus an overflow indicator, can be understood from an examination of Equation (3). Since the base $w_4$ associated with the redundant or fourth digit $a_r$ is the product of $m_1$, $m_2$, and $m_3$, the base $w_4$ is equal to 2, 3·5, or 30. Therefore $a_r$ will have a non-zero number when the number to be represented is in the invalid range greater than 29. The addition of one or more moduli to a RNS is also called an extension of the base.

FIG. 8 shows the second enlargement example, in which a ring of numbers valid from $-15$ to $+14$ inclusive, as shown in FIG. 6, is enlarged by adjoining a redundant modulus 7. The enlarged, re-dundant ring circumference is the product of the moduli 2, 3, 5, and 7, or 210. For brevity, only that part of the ring nearest the zero position is shown in FIG. 8. For purposes of sign detection, $m_N = 2$ in mixed base digits computations. In this example, the valid positive numbers have mixed base digits $a_N = 0$ (as before in FIG. 6), and also have $a_r = 0$ simultaneously. The valid negative numbers have $a_N = 1 = m_N - 1$ (as before in FIG. 6), and have $a_r = 6 = m_r - 1$ simultaneously. All numbers with other combinations of $a_N$ and $a_r$ are invalid.

Making a non-redundant ring sufficiently redundant to prevent multiplicative overflow requires a redundant circumference which is on the order of the square of the non-redundant ring circumference. This is illustrated from FIG. 7, where the largest valid multiplier and multiplicand are both 29. Their product is $29^2 = 841$. To accommodate such a large product the redundant ring would be required to have a length of at least 842, to include zero. The redundant modulus $m_r$ in this case would have to be at least 29 in order to detect multiplicative overflow. The general case would require $m_r \geq M - 1$. This brute-force approach of making a ring so redundant is hardware intensive. Hence, a technique using a smaller redundant ring and auxiliary tests, as described below, is preferred.

Another aspect of the invention uses a redundant ring right from the start, that is, it uses redundant inputs. In this aspect, the range of valid numbers is restricted to leave room for overflow detection. A preferred method is to choose the largest modulus for the highest order modulus $m_N$ in mixed base digit computations. Equation (4) is used for mixed base representation. Further, the valid numbers are restricted to the closed interval $-(M/m_N)$ to $+(M/m_N) - 1$ to permit multiplicative overflow detection. Both sign and overflow detection involve inspecting $a_N$. Such a ring is sufficiently redundant for multiplicative overflow detection when auxiliary tests, as described below, are used. Such a ring is also sufficiently redundant for residue addition overflow detection as described in the "Residue Addition Overflow Detection Processor" co-pending application, cited above.

An illustrative example of such a redundant ring is shown in FIG. 9. The moduli are 3, 5, and 7, $N = 3$, and $M = 105$. The highest order modulus is $m_3 = 7$ and $M/m_3 = 15$. The valid numbers range from $-15$ to $+14$ inclusive. As shown in FIG. 9, valid non-negative numbers have $a_3 = 0$ and valid negative numbers have $a_3 = 6 = m_3 - 1$. All invalid numbers have $a_3$ ranging from 1 to $5 = m_3 - 2$ inclusive.

The Szabo and Tanaka text describes adding a redundant modulus ad hoc to a non-redundant RNS on pages 100 through 104.

The following paragraphs will discuss the techniques discussed in the Szabo and Tanaka text in contrast to those employed in the instant invention in order to provide a thorough understanding of the detailed hardware descriptions below.

Multiplication Overflow Detection Where Operands are Positive, Zero or Negative and Non-Redundant Consider an RNS which includes the moduli:

$$m_i = \{m_1, m_2, \ldots m_{N-1}, m_N\} \tag{8}$$

where $m_N = 2$ for implicit representation of negative numbers. The ring circumference M of this non-redundant ring is given by:

$$M = \prod_{i=1}^{N} m_i \tag{9}$$

The valid range of numbers is:

$$[-((M/2)-1), +((M/2)-1)] \tag{10}$$

The brackets in Expression (10) indicate a closed interval. Note that both $+M/2$ and $-M/2$ are excluded from the ring making the ring redundant in a strict sense.

The next steps involve measuring the order of magnitude of the operands of the multiplication. The operands of multiplication will be labelled "X" and "Y". If X is large and Y is sufficiently small, or vice versa, then the product $X \cdot Y$ will be in the valid range.

The term $a_x$ can be defined as the most significant non-zero mixed base digit in the Equation (4) expansion for X. Equation (4) uses the moduli in the order given in Equation (8). If X is positive, $a_N$ in Equation (4) is zero, so x lies within the range:

$$[1, N-1] \tag{11}$$

If $X = 0$ then $x = 1$. Knowing the values of x, the bounds of X are:

$$\prod_{i=1}^{x-1} m_i \geq X < \prod_{i=1}^{x} m_i \quad X > 0 \tag{12}$$

Expression (12) demonstrates that the larger x is, the larger X is. In other words, x measures the order of magnitude of X.

The mixed base expansion of Y uses a different order of moduli than the mixed base expansion of X. The mixed base expansion of Y uses the moduli in the following order:

$$m_j = \{m_{N-1}, m_{N-2}, \ldots m_2, m_1, m_N\} \tag{13}$$

In terms of the original order of moduli, Y can be expressed by:

$$Y = b_N \prod_{i=1}^{N-1} m_i + b_1 \prod_{i=2}^{N-1} m_i + b_2 \prod_{i=3}^{N-1} m_i + \ldots + b_{N-2} m_{N-1} + b_{N-1} \tag{14}$$

The reversal of order for the first $N-1$ moduli, as illustrated by Equation (14), indicates a fixed upper limit and varying lower limit on the index in the products of the moduli in Equation (14). From left to right the mixed base digits are in descending order of significance, as in Equation (4).

The term $b_y$ can be defined as the most significant non-zero mixed base digit. For a positive Y, $b_N = 0$ so y lies within the range:

$$[1, N-1] \tag{15}$$

If $Y = 0$ then $y = N - 1$. Given y, the bounds of Y are:

$$\prod_{i=y+1}^{N-1} m_i \leq Y < \prod_{i=y}^{N-1} m_i \quad Y > 0 \tag{16}$$

Expression (16) demonstrates that the larger y is, the smaller Y is, contrary to the relationship between x and X. In other words, y is an inverse measure of the order of magnitude of Y.

The product of the Expression (12) and Expression (16) inequalities is:

$$\prod_{i=1}^{x-1} m_i \prod_{i=y+1}^{N-1} m_i \leq X \cdot Y < \prod_{i=1}^{x} m_i \prod_{i=y}^{N-1} m_i \tag{17}$$

Expression (17) provides the basis for the multiplication overflow detection test discussed in the Szabo and Tanaka text. Expression (17) provides boundaries on the product of operands X and Y and is thus a test indicative of multiplicative overflow. This test will be referred to generally as the Most Significant Digits (MSD) test.

Three possible relationships between x and y can exist. If $x > y$, then the lower limit (the left side of Expression (17)) of $X \cdot Y$ is at least $M/m_N = M/2$. Expression (10) indicates that a product of $M/m_N$ is above the valid range. Therefore, when $x > y$ multiplicative overflow has occurred in the multiplication of X and Y. i If $x < y$, then the upper limit (the right side of Expression (17)) of the product of X and Y is $(M/m_N) - 1$. This upper limit lies within the valid range of $X \cdot Y$. Therefore, when $x < y$, the product of X and Y is valid, and no additional overflow detection is required.

If $x = y$, then the lower limit of the product of X and Y is $M/m_N m_x$ and the upper limit is $(M m_x/m_N) - 1$. No conclusion concerning multiplicative overflow can be drawn in this third case. However, the range of the product of X and Y is at least known to be closely bounded in this case. The redundant ring circumference required to determine whether $X \cdot Y$ lies within this closely bounded range is only $Mm_x/m_N$. Without taking advantage of the implications of Expression (17), the redundant ring circumference would have to be approximately $(M/m_N)^2$.

The redundant modulus m added to the non-redundant RNS must be prime relative to the other moduli $m_i$ to make mixed base conversion possible and $m_r$ must be larger than $m_x$. If $m_r$ must also be chosen before x is known, then $m_r$ must also be larger than the largest non-redundant modulus except for $m_N$. That is, the following condition must be satisfied:

$$m_r > MAX(m_1, m_2, \ldots, m_{N-1}) \tag{18}$$

Using the restricted ring circumference of $Mm_x/m_N$, the magnitude of $X \cdot Y$ can be tested using the moduli $m_i$, where $m_i$ consist of the moduli defined in the following equation:

$$m_i = \{m_1, m_2, \ldots m_{N-1}, m_r\} \tag{19}$$

Note that in Equation (19) $m_N = 2$ is omitted. The mixed base expansion of X·Y using the Equation (19) moduli is:

$$X \cdot Y = c_r \prod_{i=1}^{N-1} m_i + c_{N-1} \prod_{i=1}^{N-2} m_i + \ldots + c_2 m_1 + c_1 \tag{20}$$

The variable $c_r$ is the mixed base digit corresponding to $m_r$ and lies in the range $[0, m_r-1]$. Determination of $c_r$ requires that (X·Y) mod $m_r$ be calculated from X mod $m_r$ and Y mod $m_r$. The values of X mod $m_r$ and Y mod $m_r$ can be derived using the base extension techniques described in the "Pipelined Residue to Mixed Base Converter and Base Extension Processor" co-pending application cited above. If and only if X·Y is in the valid range, then $c_r = 0$. If $c_r \neq 0$, then overflow has occurred.

The above discussion addresses the case in which the X and Y operands are positive. If X, as defined in Equation (4), is negative, then $a_N = 1$. Let $a_x$ be defined as the most significant mixed base digit other than $a_N$ which does not equal $m_x - 1$ ($m_x - 1 = (-1) \bmod m_x$). If $X = -1$, then $x = 1$. Similarly, if Y, as defined by Equation (14), is negative, then $b_N = 1$. Let $b_y$ be defined as the most significant mixed base digit other than $b_N$ which does not equal $m_y - 1$ ($m_y - 1 = (-1) \bmod m_y$). If $Y = -1$, then $y = N - 1$.

The Szabo and Tanaka text sets forth the same mixed base digit test when X and Y are negative as Tanaka method, if $x > y$, multiplicative overflow has occurred. If $x < y$, no multiplicative overflow has occurred. If $x = y$, and X·Y is negative, as determined from the signs of X and Y as found in the mixed base expansions, then $c_r = m_r - 1$ in Equation (20) if and only if the product of X and Y is in the valid range. A numerical example discussed later in the application will demonstrate that the Szabo and Tanaka test employed when $x < y$ does not always indicate the correct result.

Closer examination of the magnitude rules for negative numbers reveals that $X < 0$ and $Y < 0$ satisfy the following inequalities:

$$-\prod_{i=1}^{x} m_i \leq X < -\prod_{i=1}^{x-1} m_i, X < 0 \tag{21}$$

$$-\prod_{i=y}^{N-1} m_i \leq Y < -\prod_{i=y+1}^{N-1} m_i, Y < 0 \tag{22}$$

Expressions (21) and (22), which apply when X and Y are negative, differ from Expressions (12) and (16), which apply when X and Y are positive.

Application of Expressions (12), (16), (21), and (22) produces the following inequalities which express the range of the product of X and Y, depending upon the signs of X and Y:

$$\prod_{i=1}^{x-1} m_i \prod_{i=y+1}^{N-1} m_i \leq XY < \prod_{i=1}^{x} m_i \prod_{i=y}^{N-1} m_i \tag{23}$$
$$X > 0, Y > 0$$

$$-\prod_{i=1}^{x} m_i \prod_{i=y}^{N-1} m_i < XY < -\prod_{i=1}^{x-1} m_i \prod_{i=y+1}^{N-1} m_i \tag{24}$$
$$X > 0, Y < 0$$

$$-\prod_{i=1}^{x-1} m_i \prod_{i=y+1}^{N-1} m_i < XY < -\prod_{i=1}^{x} m_i \prod_{i=y+1}^{N-1} m_i \tag{25}$$
$$X < 0, Y > 0$$

$$\prod_{i=1}^{x-1} m_i \prod_{i=y+1}^{N-1} m_i < XY \leq \prod_{i=1}^{x} m_i \prod_{i=y}^{N-1} m_i \tag{26}$$
$$X < 0, Y < 0$$

Expression (23) is identical to Expression (17).

The rules for the magnitude of the product of X and Y are similar for the cases when $X > 0$ and $Y > 0$ (Expression 23), $X > 0$ and $Y < 0$ (Expression 24), and $X < 0$ and $Y > 0$ (Expression 25). That is, $x > y$ implies overflow, $x < y$ excludes overflow, and $x = y$ indicates that the bounds of the magnitude of X·Y are $M/m_N m_x$ to $Mm_x/m_N$. However, there is an important difference in the case when $X < 0$ and $Y < 0$ (Expression 26. If $y = x + 1$ then Expression 26 includes invalid M/2 (M/2 = M/$m_N$) as a possible value for X·Y. The following special case illustrates this fact.

If $$X = -\prod_{i=1}^{a} m_i, \text{ then } x = a. \tag{27}$$

If $$Y = -\prod_{i=a+1}^{N-1} m_i, \text{ then } y = a + 1 = x + 1 \tag{28}$$

For this special case when $X < 0$ (Equation 27) and $Y < 0$ (Equation 28), the product of X and Y equals $+M/m_N$, which is outside the valid range. However, the theory discussed in the Szabo and Tanaka text suggests that when $x < y$, the product of X and Y is valid.

This unique case of failure of the Szabo and Tanaka most significant digit test can be detected by performing a redundant ring mixed base digit computation. When this unique case occurs, $c_r$ will be equal to 1, which is an invalid number result. In general, $c_r = [1, m_r - 2]$ represents invalid numbers.

The following numerical example will illustrate the theory described above. Assume a RNS with moduli $m_i$ of 2, 3, 5. The ring circumference M of this RNS is 30. Operands X and Y are valid in the range $[-15, 14]$. To identify negative numbers by mixed base representations, $m_N$ is set equal to 2. The moduli $m_i$ for X are therefore $m_1 = 3$, $m_2 = 5$ and $m_3 = 2$. The moduli $m_i$ for Y are $m_1 = 5$, $m_2 = 3$, and $m_3 = 2$. The redundant modulus $m_r$ for the multiplicative overflow test is 7, the prime number next larger than 5, the largest modulus of the original set. FIG. 10 lists the mixed base representations of the operands X and Y and their associated decimal equivalents and ring positions. FIG. 10 also lists the mixed base representation of the product of X and Y and the order of magnitude measures x and y for X and Y. When the decimal number is +15, which is not a valid member of the ring, $c_r$ is equal to 1 indicating that +15 is not within the valid range. For example, assume $-3$, having mixed base digits $a_3 = 1$, $a_2 = 4$, and $a_1 = 0$ is X. Since X is negative, as indicated by the fact that $a_3=1$, then x is the subscript of the most significant mixed base digit other than $a_N$ which does not equal $m_x-1$. Therefore, x is equal to 1. Similarly, assume $-5$ having mixed base digits $b_3=1$, $b_1=2$, and $b_2=0$ is Y. Since Y is negative, as indicated by the fact that $b_3=1$, then y is equal to 2. Since $x<y$ the $c_r$ digit must be examined to determine if the product of $-3$ and $-5$ is valid. Since $c_r$ is equal to one, the product of $-3$ and $-5$ is determined to be outside of the valid range of $[-15, 14]$.

It appears that the technique discussed in the Szabo and Tanaka text assumes serial processing methods. Specifically, the Szabo and Tanaka text states that the most significant digits test is applied first, and then if $x=y$, the processing proceeds to finding the mixed base digits for the product. The Szabo and Tanaka technique places a premium on saving steps by using a single criterion algorithm. The Szabo and Tanaka text also states that the statistical likelihood of x being equal to y is relatively small based on examples employing larger ring systems than the ones described above. This implies that a processor using the Szabo and Tanaka technique will only infrequently require calculation of the mixed base digits of the product. Further, the Szabo and Tanaka technique appears to exclude $-M/2$ from the ring ($-15$ in FIG. 10) in order to ensure the validity of the most significant digits test. Excluding the validity of $-M/2$ allows detection of $+M/2$, which occupies the same position as $-M/2$ in the non-redundant ring, from residues using the property that $(M/2)$ mod 2 is equal to 1. Other residues of M/2 are zero. These residues can be used to provide gating against a product of M/2 as discussed in the footnote on page 100 of the Szabo and Tanaka text.

In contrast to the Szabo and Tanaka technique which relies on serial processing, the instant invention relies on parallel processing. Parallel processing permits making more than one kind of test at a time. Parallel processing requires more hardware, but results in a faster overflow detection process. Therefore, in the parallel processor according to the instant invention, $-M/2$ ($-M/2 = -M/m_N$) can be within the valid range by applying both the most significant digits test and the redundant ring, or $c_r$, test and indicating overflow if either test indicates overflow.

Multiplication Overflow Detection Where Operands are Restricted to Non-Negative Numbers and are Non-Redundant The theory for multiplication overflow detection in a ring of non-negative numbers is similar to the theory discussed above for positive and negative numbers with a few minor changes. The valid range of the ring is $[0, M-1]$. The $a_N$ digit may be non-zero for valid numbers, hence magnitude measure x lies within the range $[1, N]$. The range of X for a given x is given by Expression (12). The modulus $m_N$ is not required to detect negative numbers, so $m_N$ is not required to be equal to 2. Since $m_N$ is not required to be equal to 2, the order of the moduli in the mixed base digit representation of Y can be profitably recast as follows:

$$m_j = \{m_N, \ldots, m_1\} \tag{29}$$

Using the order of the moduli defined by Equation (29), Equation (14), Expressions (16) and (17), and Equation (20) become:

$$Y = b_1 \prod_{i=2}^{N} m_i + b_2 \prod_{i=3}^{N} m_i + \ldots + b_j \prod_{i=j+1}^{N} m_i + \ldots b_N \tag{30}$$

$$\prod_{i=y+1}^{N} m_i \leq Y < \prod_{i=y}^{N} m_i \tag{31}$$

$$\prod_{i=1}^{x-1} m_i \prod_{i=y+1}^{N} m_i \leq XY < \prod_{i=1}^{x} m_i \prod_{i=y}^{N} m_i \tag{32}$$

$$X \cdot Y = c_r \prod_{i=1}^{N} m_i + c_N \prod_{i=1}^{N-1} m_i + c_{N-1} \prod_{i=1}^{N-2} m_i + \ldots + c_2 m_1 + c_1 \tag{33}$$

Expression (32) indicates that when $x>y$ the lower limit on the product of X and Y is at or above M, which is an overflow condition for the product of X and Y. If $x<y$, the upper limit on the product of X and Y is below M, which means that overflow did not occur in multiplying X and Y. If $x=y$ then the product of X and Y is bounded according to the following expression:

$$M/m_x \leq XY < Mm_x \tag{34}$$

When the product of X and Y is bounded by Expression (34), multiplicative overflow occurrence can be tested utilizing a redundant ring mixed base digit computation using any redundant modulus $m_r$ larger than, and prime relative to, every $m_i$. In this redundant ring test, when mixed base digit $c_r$ is greater than 0 overflow has occurred. FIG. 11 illustrates mixed base representations of X and Y where X and Y are non-negative. FIG. 11 also lists the magnitude measures x and y and the mixed base digits for the examination of the product of X and Y.

Summary for Non-Redundant Residue Number Operands

As described above, the $x>y$ case of the most significant digits test can be used to detect overflow associated with large products. Detecting large overflows through use of the $x>y$ test permits testing for smaller overflows utilizing a redundant ring having a circumference of $M_r$ which is much less than $(M/2)^2$, where $m_N=2$. A redundant ring satisfying the following inequality is sufficiently large to detect overflows not detected by the $x>y$ test:

$$M_r > m_x \prod_{i=1}^{N-1} m_i \tag{35}$$

where:

$$m_r > \text{MAX}(m_1, m_2, \ldots m_{N-1}) \tag{36}$$

The exception to the rule that when $x<y$ no multiplicative overflow has occurred can be accommodated by utilizing the same $c_r$ test used when $x=y$. If calculation of $c_r$ is performed in parallel with x and y magnitude measure processing, then accommodation of the $x<y$ exception does not delay overflow detection time. To apply the $c_r$ test, a base extension algorithm is performed in parallel to mixed base digit computations, for each of the operands, required the most significant digits test. The base extension algorithm generates X mod $m_r$ and Y mod $m_r$. After the base extension algorithm (X·Y) mod $m_r$ is computed and the mixed base expansion of X·Y is calculated.

Multiplication Overflow Detection Where Operands are Redundant Residues

Multiplicative overflow detection procedures can be accelerated by receiving redundant residue operands at the beginning of the procedure and utilizing redundant residues throughout the overflow detection process. The acceleration comes from having the residues X mod $m_r$ and Y mod $m_r$ available for multiplication in a first step instead of at the end of a multi-step base extension process. When XY mod $m_r$ is computed in a first step, the computation of mixed base digits for the operands and for the product can be arranged to proceed nearly simultaneously, thereby shortening the process time. One could use the nonredundant moduli $m_1$ through $m_N$ with $m_N = 2$ and a redundant modulus $m_r$ as described above. When redundant residue operands are employed, all three ($a_i$, $b_i$, and $c_i$) mixed base digit computations are performed in parallel to ascertain $x - y$ and $c_N$. The term $c_N$ is used to refer to the highest order digit when redundant operands are received at the beginning of the multiplication procedure, even though the highest order digit is redundant operands are received. In this accelerated process, multiplicative overflow has occurred if $x > y$ or if $c_N = [1, m_r - 2]$. Conversely, multiplicative overflow has not occurred if $x \leq y$ and $c_N = 0$, or if $x \leq y$ and $c_N = m_r - 1$ ($m_r - 1 = (-1) \mod m_N$).

The above tests for the accelerated process assume that the moduli include the choice $m_N = 2$, as is the case when a non-redundant ring employing sign detection via mixed base digit $a_N$ is used. However, sign detection, invalid number detection and multiplicative overflow detection can be done with less hardware when larger moduli for $m_N$ are used and when redundancy is permitted.

As a practical matter in general purpose RNS computational systems, all these larger moduli are odd, because the residues of even numbers modulo even moduli disadvantageously lack multiplicative inverses. An example is the modulus 26, used in English language cryptography, where all the even ring members and 13 lack multiplicative inverses.

The use of an odd number for $m_N$ is illustrated in FIG. 12, where $m_N = 7$. In this ring, mixed base digit $a_3$ is 0 only for non-negative numbers 0 to 14 and is 6 only for negative numbers $-15$ to $-1$. The other values of $a_3$, 1 to 5, occur for invalid numbers. Thus, $a_3$ serves not only to detect sign but also to discriminate between valid and invalid numbers.

The valid range $[-15\ +14]$ of the RNS shown in FIG. 12, is also expressible as $[-m_1 m_2, m_1 m_2 - 1]$. From this, and the theorems above, it is seen that the most significant digits test allows overflow testing to be performed using any $m_3$ greater than both $m_1$ and $m_2$. Therefore since $m_1 = 3$ and $m_2 = 5$, or vice versa, it is advantageous to choose the next larger prime, 7, for $m_3$ in order to detect multiplicative overflow. FIG. 12 lists numerical values useful for verifying that multiplicative overflow may be detected in this RNS via the operand magnitude indicators x and y and via the product mixed base digit $c_3$.

The RNS of FIG. 12 operates advantageously with one fewer modulus, that is, with less hardware, than the RNS of FIG. 10 which has the same valid range.

The example of FIG. 12 is generalized by recasting the techniques discussed in the Szabo and Tanaka text, beginning with Equation (8), to operate on a redundant ring. A method of the instant invention replaces the restriction $m_N = 2$ with $m_N > MAX(m_1, \ldots, m_{N-1})$, that is, $m_N$ is the largest of the moduli. The redundant ring circumference M (the subscript r is dropped since the ring is already redundant and requires no base extension) is given by Equation (9). However, the valid range of numbers is now:

$$[-(M/m_N), +(M/m_N)-1] \qquad (37)$$

The generation of the operand magnitude indicators x and y proceeds as before for both non-negative and negative operands, arriving at Expressions (23)–(28). The results are that $x > y$ indicates an overflow, $x = y$ indicates that the absolute value of the product XY is bounded by $M/m_N m_x$ to $M m_x/m_N$ where $x = [1, N-1]$, and $x < y$ indicates an underflow except when $X < 0$, $Y < 0$ and $XY = +(M/m_N)$. This exception will be detected successfully via the mixed base digit $c_N$, which is computed in accordance with Equation (38):

$$X \cdot Y = c_N \prod_{i=1}^{N-1} m_i + c_{N-1} \prod_{i=2}^{N-2} m_i + \ldots + c_2 m_1 + c_1 \qquad (38)$$

An invalid product will have $c_N$ in the range [1, $m_N - 2$]. A valid positive product will have $c_N = 0$ and a valid negative product will have $c_N = m_N - 1$. The redundant ring size is sufficient to detect multiplicative overflow because $m_N$ exceeds any possible $m_x$. That is, $m_N$ satisfies the conditions of Expression (36) by reason of choosing it to be the largest of all the moduli. This reason also makes $m_N > 3$, which is sufficient for additive overflow detection in a redundant ring as described in the co-pending "Residue Addition Overflow Detection Processor" application cited above.

From the foregoing, it is seen that restricting the operands in this RNS to positive numbers is disadvantageous, because the largest positive valid product will not thereby be increased above $M/m_N$. It is also seen that where Szabo and Tanaka's theorems involve $N+1$ moduli to cover a given valid range and indicate multiplicative overflow, the redundant RNS uses only N moduli for the same task. The reason is that in Szabo and Tanaka's technique, sign detection is accomplished via $m_N = 2$ in the operands and via the redundant modulus $m_r$ in the product, whereas in the present invention, sign is detected in both the operands and the product via one modulus $m_N$. Therefore, in a general purpose RNS computational system, the present invention requires less hardware than Szabo and Tanaka's technique.

Detailed Hardware Description

The invention employs the Optical Arithmetic and Logic Units (OALUs) described in the U.S. Pat. No. 4,797,843 and 07/019,761 co-pending application cited above; the parallel residue to mixed base converter described in the "Parallel Residue to Mixed Base Converter" co-pending application cited above; the optical arithmetic comparators (OACs) described in co-pending application Ser. No. 07/287,275 filed Dec. 21, 1988, and entitled "A Method And Apparatus For Performing a Multiple-Input Optical Arithmetic Comparison"; and the mixed base, or mixed radix, digit computation techniques described in the "Pipelined Residue to Mixed Base Converter and Base Extension Processor" co-pending application cited above, to detect overflow resulting from residue multiplication. Numerical examples will be used for illustrative purposes.

The theory above demonstrates that RNS multiplicative overflow detection requires hardware for mixed base digit computation, base extension, multiplication, logical ORing, hardware for determining the most significant digit (MSD) measures x and y, and hardware for comparing x and y.

Figure 13:
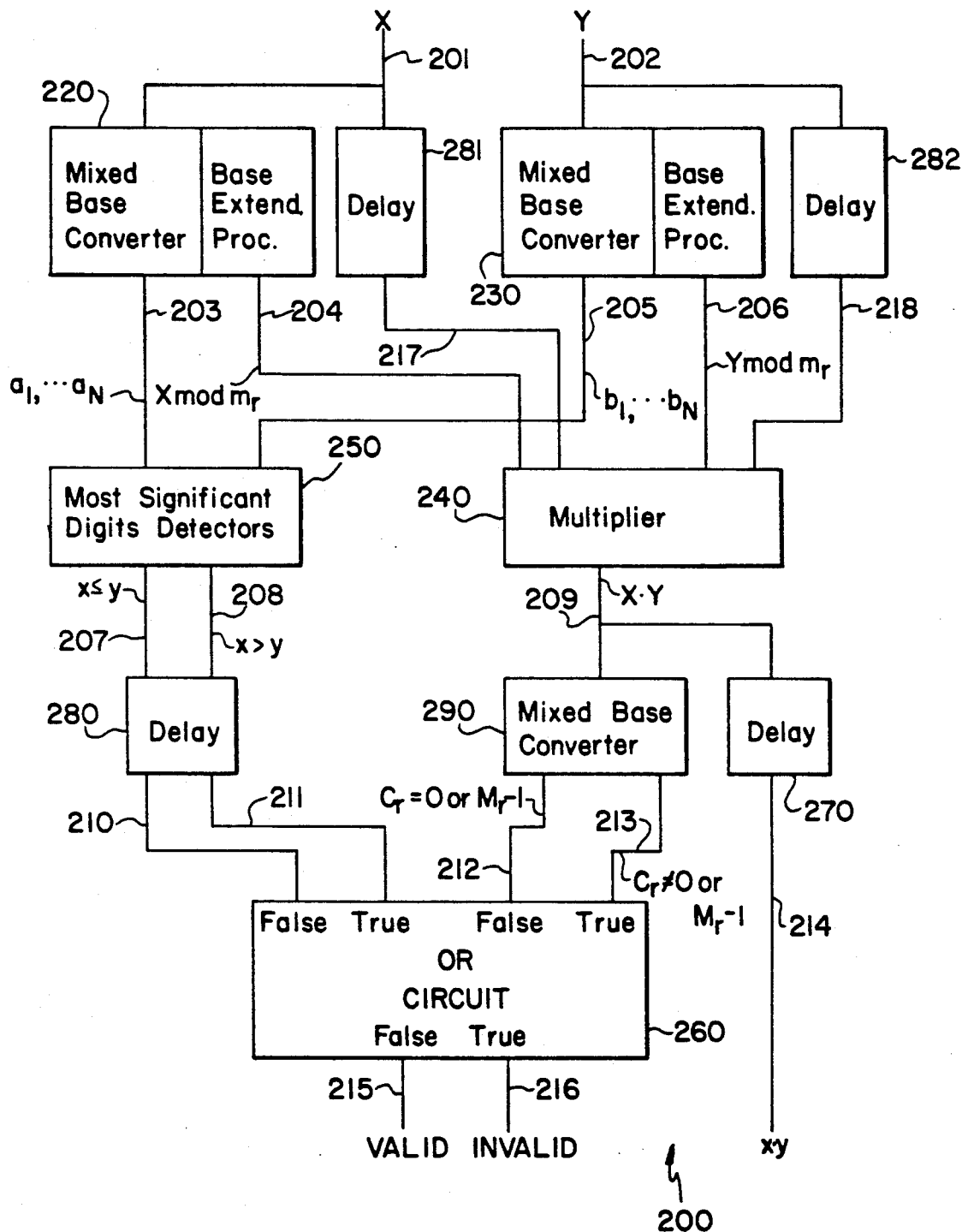
FIG. 13 illustrates a first preferred embodiment of the invention.

FIG. 13 illustrates a RNS multiplication overflow detector 200 according to a first preferred embodiment of the invention. The detector 200 receives non-redundant operands X and Y via optical signal lines 201 and 202 and transmits the product of operands X and Y via signal lines 214. The detector 200 also generates and transmits either a VALID signal via signal line 215 or an INVALID signal via signal line 216 to indicate whether or not the multiplication of X and Y has resulted in multiplicative overflow. Throughout this description, the term signal line will be understood to mean any optical transmission path.

In the first preferred embodiment illustrated in FIG. 13, operand X is transmitted to mixed base digit converter and base extension processor 220 and to delay circuit 281 via signal lines 201, and from delay circuit 281 to multiplier 240 via signal lines 217. Operand Y is transmitted to mixed base converter and base extension processor 230 and to delay circuit 282 via signal lines 202, and from delay circuit 282 to multiplier 240 via signal lines 218. The converter/processors 220 and 230 generate mixed base digits $a_1, a_2, \ldots a_N$ corresponding to X and $b_1, b_2, \ldots b_N$ corresponding to Y and transmit the mixed base digits to MSD tester 250 via signal lines 203 and 205, respectively. The converter/processors 220 and 230 also generate a redundant residue digit for X, X mod $m_r$, and a redundant residue digit for Y, Y mod $m_r$, and transmit the redundant residue digits to multiplier 240 via signal lines 204 and 206 respectively. Suitable designs for the converter/processors 220 and 230 are described in detail in the "Pipelined Residue to Mixed Base Converter and Base Extension Processor" copending application cited above.

The multiplier 240 multiplies X, which now includes redundant residue digit X mod $m_r$, and Y which now includes redundant residue digit Y mod $m_r$, using residue multiplication. Suitable designs for the multiplier 240 are described in detail in the U.S. Pat. No. 4,797,843 and the application Ser. No. 07/019,761 co-pending cited above. The multiplier 240 transmits the product X·Y to delay circuit 270 and to mixed base converter 290 via signal lines 209.

The MSD detector 250 computes X magnitude measure x and Y magnitude measure y and determines whether x is less than or equal to y or whether x is greater than y. If $x \leq y$, then a true signal is transmitted to delay circuit 280 via signal line 207. If $x > y$, then a true signal is transmitted to delay circuit 280 via signal line 208. A detailed design of the MSD detector 250 will be described later after the overall operation of multiplication overflow detector 200 is described. As described above, use of the $x > y$ test to detect large product overflows eliminates the need for a large redundant ring and thus greatly reduces the hardware required for overflow detection.

The processing performed by detector 200 is carried out in a pipelined fashion. For example, the processing performed by converter/processors 220 and 230 is performed in parallel for a given pair of operands, and then the processing performed by tester 250 and multiplier 240 is performed in parallel for the same given set of operands. Delay circuits 280, 281, 282, and 270 maintain the synchronism of the pipelined processing performed by detector 200. Delay circuit 280 transmits the $x \leq y$ or the $x > y$ signal to OR circuit 260 via signal lines 210 or 211 respectively. Delay circuit 270 delays the product of X and Y received via signal line 209 and transmits the delayed product of X and Y on signal line 214 when corresponding VALID or INVALID signals are available. Suitable delay circuits are described in the "Pipelined Residue to Mixed Base Converter and Base Extension Processor" co-pending application, cited above.

Mixed base converter 290 receives the product of X and Y via signal lines 209 and generates the redundant mixed base digit $c_r$ associated with the product of X and Y. The design of mixed base converter 290 is similar to the design for converter/processors 220 and 230 except that base extension hardware is not required. The converter 290 also includes logic hardware to generate and transmit a true signal on signal line 212 when $c_r = 0$ or when $c_r = m_r - 1$ and a true signal on signal line 213 otherwise.

Modulo 2 OR circuit 260 receives the signals on signal lines 210, 211, 212, and 213 and generates and transmits either a VALID signal on signal line 215 or an INVALID signal on signal line 216. Generation of either an active VALID signal or an active INVALID signal is important since processing circuitry (not shown) connected downstream of the detector 200 usually requires an active input regardless of whether or not overflow has occurred in order to retain the one-of-many residue logic format. A VALID signal is generated when both an active signal is received from signal line 210 and an active signal is received via signal line 212, otherwise the INVALID signal is generated. The OR circuit 260 can be constructed using any of the OALUs described above.

As described above, the detector 200 multiplies two operands X and Y using RNS multiplication and generates either a VALID or an INVALID signal indicating whether the product of X and Y is out of the valid range.

The processing performed by multiplier 240 and converter 290 requires 2N stages, or steps, of OALUs assuming that $m_N = 2$ and that negative numbers are used. Parallel to the processing performed by multiplier 240 and converter 290, x and y are determined and compared using the MSD test. The MSD test requires N−1 steps. Two steps are required to determine x and y and one step is required to compare x and y. The total number of steps required by the MSD detector 250 is therefore N+2. Therefore, N−2 steps of delay are employed by delay circuit 280 for synchronism.

Figure 14:
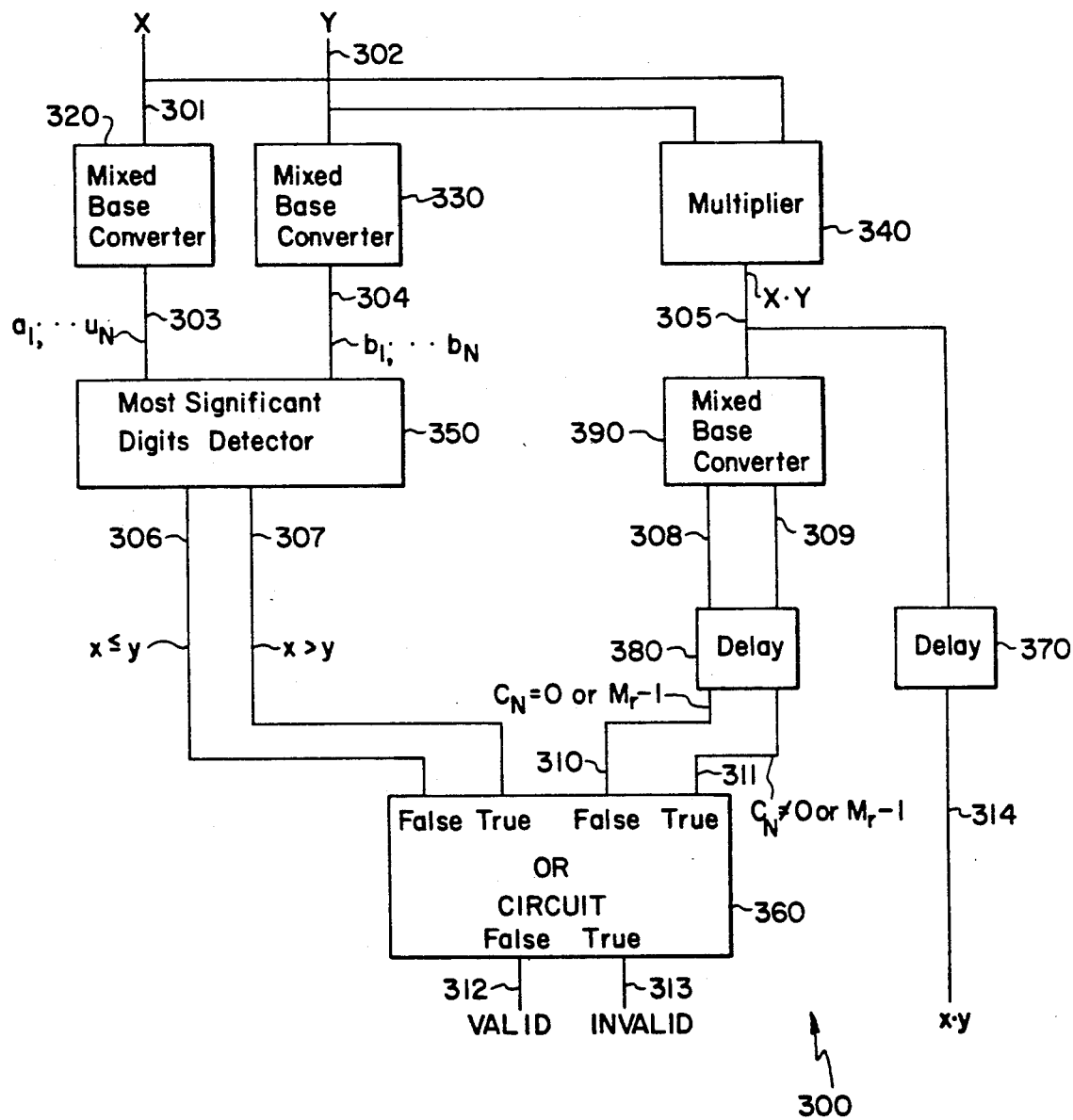
FIG. 14 illustrates a second preferred embodiment of the invention.

FIG. 14 illustrates a RNS multiplication overflow detector 300 according to a second preferred embodiment of the invention. The detector 300 is similar in construction and operation to the detector 200 except that detector 300 receives operands X and Y in redundant form. That is, X, received on signal lines 301, contains an X mod $m_r$ digit and Y, received on signal lines 302, contains an Y mod $m_r$ digit. Multiplier 340, detector 350, converter 390 and OR circuit 360 of the FIG. 14 second preferred embodiment are constructed and operated similarly to multiplier 240, detector 250, converter 290, and OR circuit 260 of the FIG. 13 first preferred embodiment. Mixed base converters 320 and 330 do not perform base extension since operands X and Y are received in redundant form.

The product of X and Y in the second preferred embodiment is calculated immediately at receipt of the operands X and Y. Multiplying X and Y and calculating the redundant mixed base digit $c_N$ corresponding to the product requires N steps. Delay circuit 380 provides two steps of delay to preserve synchronism with the MSD processing, which requires N+2 steps. The OR circuit requires one step, making the total number of steps for overflow detection by detector 300 N+3 steps, which is faster than the detector 200 when N>1.

In both the first and second embodiments, the time consuming operations are the mixed base digit computation operations and the base extension operations. To speed up the overall overflow detection process, the parallel hardware and methods described in the "Parallel Residue to Mixed Base Converter" co-pending application cited above can be employed for mixed base digit computation. The parallel method is particularly well suited when small rings are being utilized. The parallel method requires one step instead of N. The total number of steps for the MSD test would then be 4. If a table-lookup method is used for base extension, then the total number of steps required to compute the product of X and Y and $c_N$ is 3 at most. Including the final OR processing, the entire overflow detection process would then only require five steps.

Figure 15:
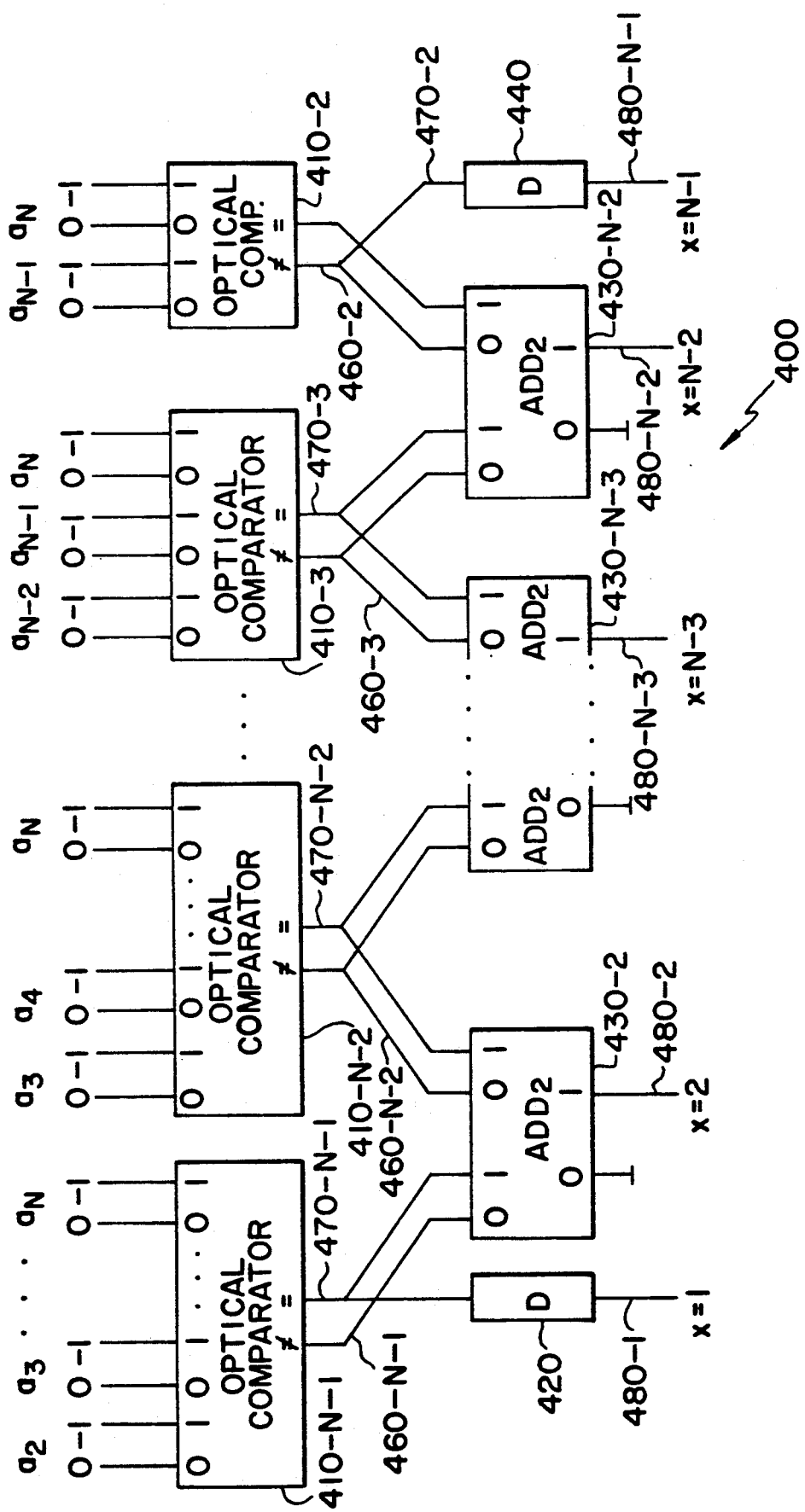
FIG. 15 illustrates a design for a most significant digit detector suitable for use with negative and non-negative values of operand X in the FIGS. 13 and 14 embodiments.

To find the most significant digit of the mixed base representation of an operand by a parallel method, the number of the highest order mixed base digit, except for a, which equals zero (positive numbers) or (−1) mod $m_i = m_i − 1$ (negative numbers) must be counted. FIG. 15 illustrates an MSD detector 400 suitable for use as detectors 250 or 350.

The MSD detector 400 illustrated in FIG. 15 can be used for negative and non-negative values of X represented by mixed base digits $a_i$. An MSD detector for negative and non-negative values of Y will be described with respect to FIG. 17. The detector 400 includes optical arithmetic comparators (OACs) 410 which receive input values and which generate complementary outputs. OAC 410−N−1 has N−1 inputs, and so forth. Suitable OACs are described in detail in co-pending application Ser. No. 07/287,275, cited above. In FIG. 15, the input labelled "−1" is understood to mean for an associated $a_i$ that the associated at $a_i$ equals (−1) mod $m_i$ which equals $m_i − 1$. The input labelled "0" means $a_i$ equals zero. Downstream of the OACs are modulo 2 adders 430. Modulo 2 addition is equivalent to the logical exclusive −OR (XOR) operation. Parallel to the adders 430 are delay circuits 420 and 440 to maintain synchronism. Adders 430 and delay circuits 420 and 440 can be constructed using the OALUs referred to above.

The "=" OAC outputs are connected to the zero inputs of the adders 430 via optical lines or optical paths 460 and the "≠" OAC outputs are connected to the one inputs of the adders 430 via optical lines or optical paths 470. The magnitude measure x is transmitted from MSD detector 400 as an active signal on one of optical signal lines or optical paths 480.

As shown in FIG. 15, the OAC 410 inputs from right to left, that is, from OAC 410−2 to OAC 410−N−1, include successively more of the highest order mixed base digits except for $a_1$. The OACs from right to left produce consecutive "=" outputs down to, but not including, the particular OAC which includes the most significant $a_i$ as an input. This particular OAC and all of the OACs to the left of this particular OAC produce consecutive "≠" outputs.

The division between the consecutive "=" outputs and the consecutive "≠" outputs is detected by the chain of modulo 2 adders 430. Each adder produces a "0" output when its two inputs are equal. The "0" output is not connected to optical circuitry. The "1" output occurs only when its left-hand input is "≠" and its right-hand input is "=". The active signal from the "=" output of one of the adders 430 specifies the value of x. An x=1 signal is transmitted from the left-most OAC "=" output and the x=N−1 signal is transmitted from the right-most OAC "≠∞" output via one step delay circuits 420 and 440 to preserve synchronism.

Figure 16:
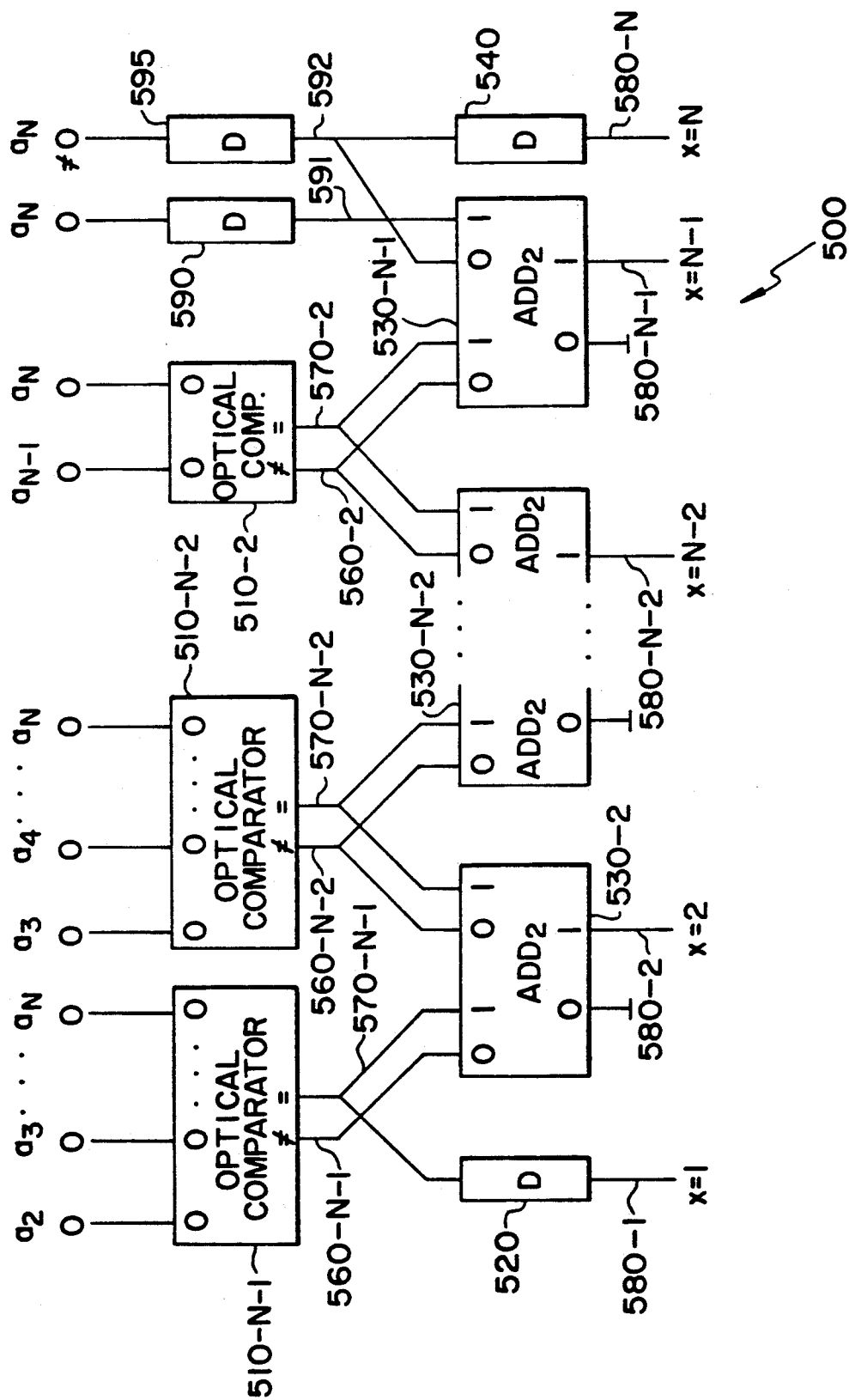
FIG. 16 illustrates a design for a most significant digit detector suitable for use with non-negative values of operand X in the FIG. 13 and 14 embodiments.

FIG. 16 illustrates an MSD detector 500 for non-negative numbers. In the detector 500 OACs 510 have only one input value, 0. If $a_N > 0$ (or $a_N \neq 0$) then all of the OACs 510 outputs are "≠". The $a_N \neq 0$ signal lines are OR'ed together to form the x=N output on signal line 580−N and are applied to the "0" input of the right-most modulo 2 adder 530−N−1 to inhibit its "1" output in this case. The $a_N = 0$ signal line is connected to adder 530−N−1 to provide a one-of-many input format. If $a_N = 0$ and $a_{N−1} > 0$ the resulting 0,1 input to adder 530−N−1 causes adder 530−N−1 to generate the x=N−1 signal on signal line 580−N−1.

The MSD detector for a non-negative operand Y is the same as detector 500 of FIG. 16 except that the order of significance of the $b_j$ digits is reversed, that is, $b_1$ to $b_N$ being the most significant to the least significant. Accordingly, in the Y detector $b_N$ is omitted from the OAC inputs and $b_1$ is connected to all of the OACs.

Figure 17:
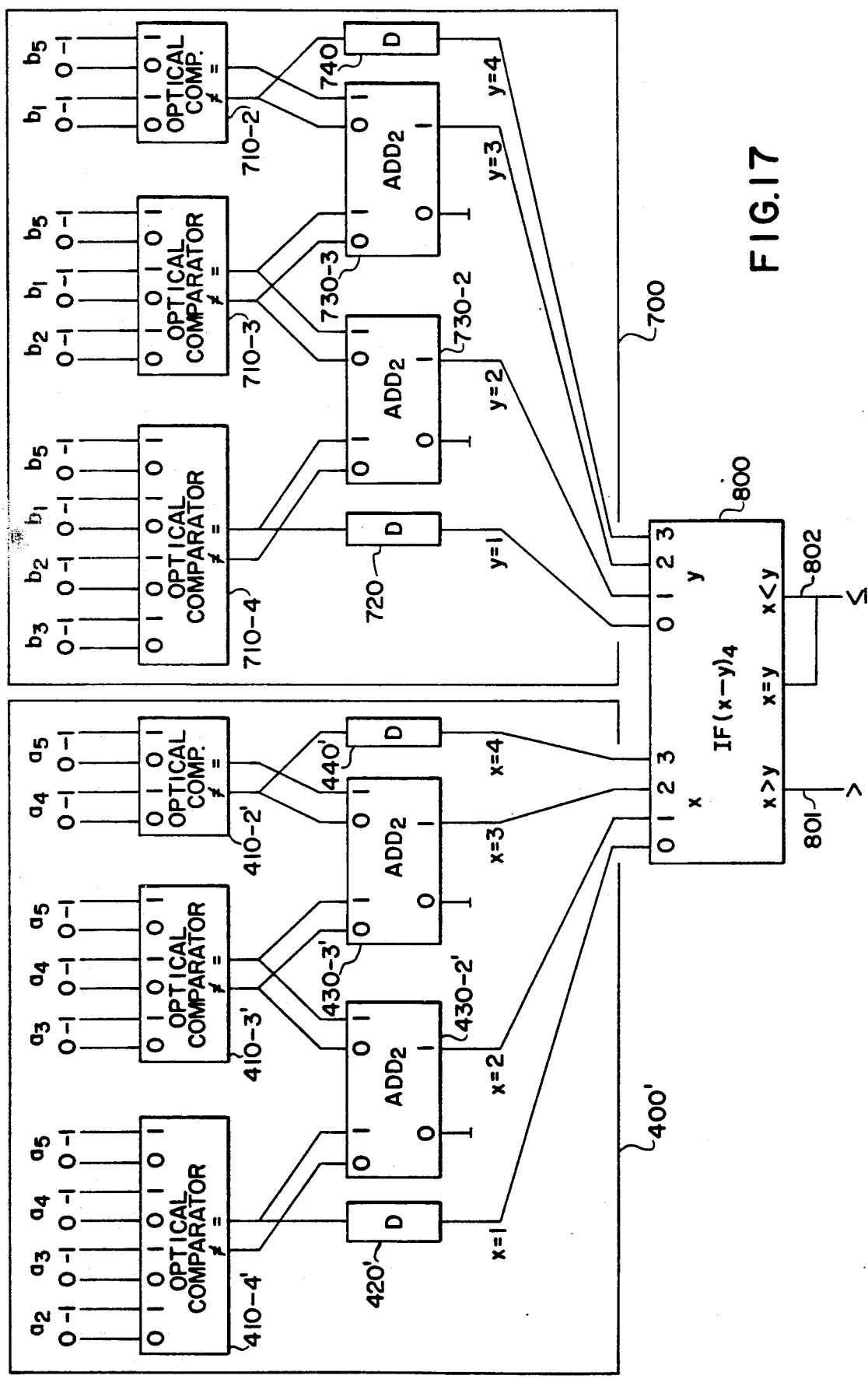
FIG. 17 illustrates a design for most significant digit detectors and a comparation circuit suitable for use with negative and non-negative values of operands X and Y in the FIG. 13 and 14 embodiments.

FIG. 17 illustrates an MSD detector 700 for use with negative and non-negative values of operand Y. By way of example, the MSD detector 700 illustrated in FIG. 17 receives five input mixed base digits corresponding to five moduli. The MSD detector 700 of FIG. 17 is similar in design to the MSD detector 400 of FIG. 15.

The order of significance of mixed base digits where negative values are involved for operand Y is $b_N, b_1, \ldots b_{N−2}, b_{N−1}$. To find the Y magnitude measure y the least significant mixed base digit, $b_{N−1}$, is omitted from the OAC connections. The remaining mixed base digits, $b_j$, are connected to the OACs in order of significance, as illustrated in MSD detector 700 in FIG. 17.

FIG. 17 also illustrates an MSD detector 400' for operand X and comparison circuit 800 for comparing the magnitude measures x and y. The MSD detector 400' of FIG. 17 is identical to MSD detector 400 of FIG. 15. In MSD detector 400', N equals five.

Comparison circuit 800 is an OALU, of the type described or referenced above, which compares x and y. Comparison circuit 800 operates as a three-branch arithmetic modulo 4 IF(x−y)$_4$ device. A two-branch device can also be employed since the separation of the x=y and x<y outputs shown in FIG. 17 is not necessary for multiplicative overflow detection. The x=y and x<y outputs are OR'ed together external to the device, effectively forming a two-branch IF device. In general, where N moduli are involved in the overflow detection process a modulo N−1 subtractor with appropriate output connections can be employed for the magnitude comparison. FIG. 17 illustrates a modulo 4 subtraction device by way of example.

Figures 18A, 18B:
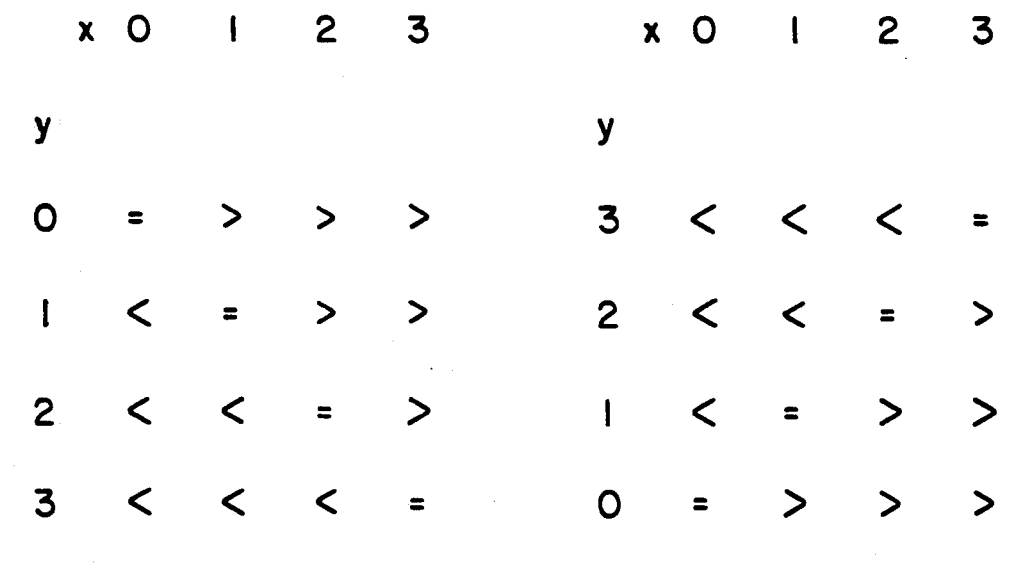

Instead of using residue arithmetic output connections as the output from comparison circuit 800, logical outputs are utilized. If the OAC design described above were not utilized, a longer multiple step decision tree of OALU subtractors would have to be used instead. FIGS. 18(a) and 18(b) list logic tables for a modulo 4 arithmetic IF$(x-y)_4$ comparator. FIG. 18(a) applies to a three-branch optical cross bar ALU comparator. In FIG. 18(a) the "=" outputs appear in the figure in diagonal form. FIG. 18(b) applies to a three-branch pattern recognition OALU. In FIG. 18(b) the "=" outputs appear in cross-diagonal form.

The optical multiplicative overflow detection processors can alternatively be implemented electronically. That is, the OALUs employed to accomplish multiplication, mixed base computation, and base extension can be replaced with an electronic network, or gate array, of AND-OR gates.

The OR circuits 260 and 360 can be realized electronically utilizing a two-input binary electronic OR gate having as inputs the ">" output from the MSD detector and the "$c_r \neq 0$ or $m_r - 1$" output from the $c_r$ mixed base digit computation. The single output of this two-input binary electronic OR gate is a logic 1 for a VALID signal and a logic 0 for an INVALID signal, or vice-versa, according to the designer's preference.

The OAC portion of the MSD detectors illustrated in FIGS. 15, 16, and 17 can be replaced with a network, or gate-array, or AND-OR gates. The MAJORITY function described in co-pending application Ser. No. 07/287,275, cited above, is not required for MSD detection.

Figure 19:
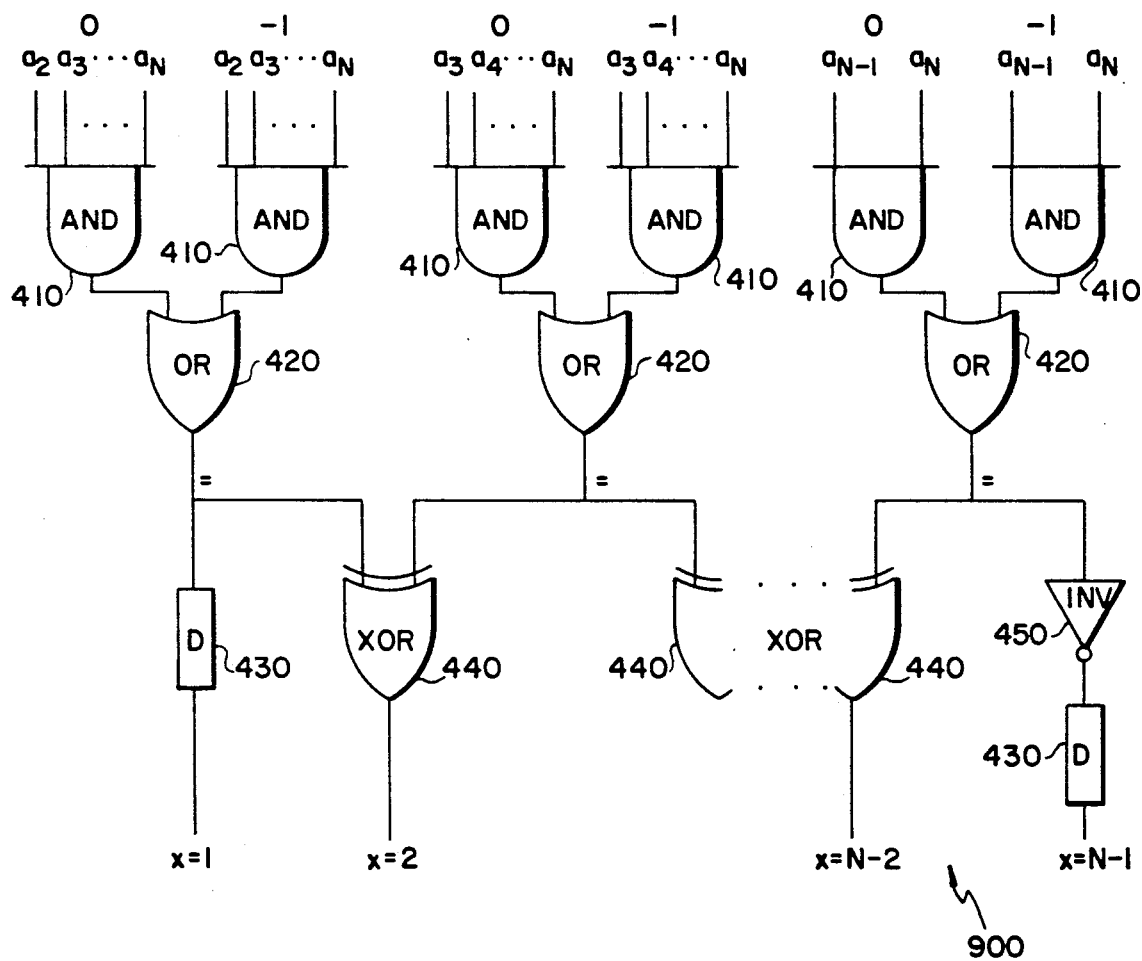
FIG. 19 illustrates an electronic most - significant digit detector for negative and non-negative inputs.
Figure 20:
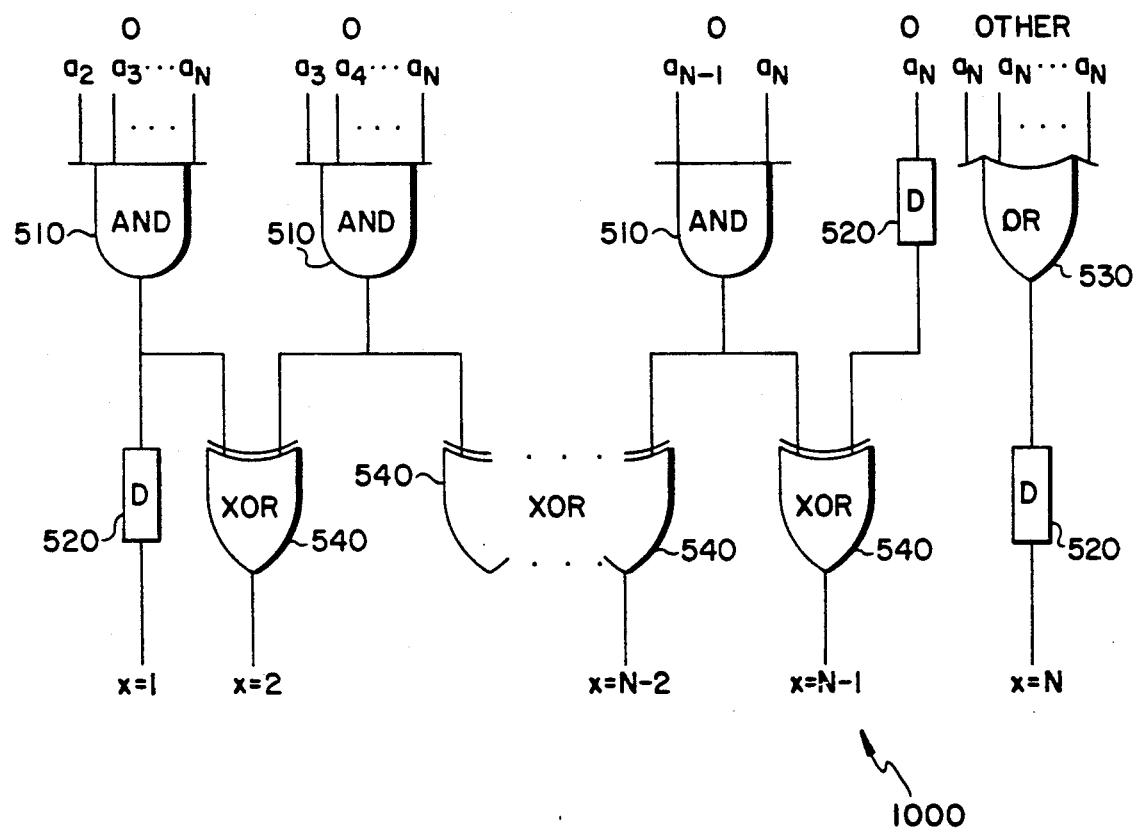
FIG. 20 illustrates an electronic most significant digit detector for non-negative inputs.

FIG. 19 illustrates an electronic MSD detector 900 for negative and non-negative mixed base digits which are represented in one-of-many, or positional, representation. In FIG. 19, "−1" denotes an input value of $m_i - 1$, where $m_i$ is the modulus corresponding to mixed base digit $a_i$. In FIG. 20, AND gates 410, OR gates 420, XOR gates 440, delay circuits 430, and inverter 450 are connected to accomplish MSD detection.

FIG. 20 illustrates an electronic MSD detector 1000 for non-negative mixed base digits represented in one-of-many, or positional, representation. The signal lines labeled OTHER are the wired-OR non-zero signal lines for mixed base digit $a_N$. In FIG. 20, AND gates 510, delay circuits 520, OR circuit 530, and XOR gates 540, are connected to accomplish MSD detection.

The modulo 2 adders 430, 530, 430', and 730 of FIGS. 15, 16, and 17 can be implemented with electronic XOR gates having as inputs the "=" outputs from the electronic substitutes for the OACs.

The IF$(x-y)_4$ comparison circuit 800 of FIG. 17 can be implemented electronically in at least two way. First, the comparison circuit can be implemented using a gate array wired in accordance with FIG. 18(a). Second, the comparison circuit can be implemented utilizing a digital comparator circuit, such as the TTL SN 7485, or a network of digital comparator circuits. This digital comparator circuit has "<", "=", and ">" outputs. The one-of-many digital representation at the inputs of the digital comparator circuit are similar to the various powers-of-two used in conventional binary circuits.

The foregoing description has been set forth merely to illustrate preferred embodiments of the invention and is not intended to be limiting. Modifications are possible without departing from the scope of the invention. For example, the OAC design described above can be extended to fixed base, e.g., binary or decimal, representations. Since modification of the described embodiments incorporating the spirit and substance of the invention may occur to persons skilled in the art, the scope of the invention should be limited solely with respect to the appended claims and equivalents.

What is claimed is:

1. An overflow detection processor which detects whether or not multiplicative overflow has occurred during multiplication of a first operand and a second operand, said first and second operands being in redundant representation of a residue number system, said overflow detection processor comprising:

a first mixed base converter connected for receiving said first operand and converting said first operand into a first set of mixed base digits;

a second mixed base converter connected for receiving said second operand, in parallel to said first mixed base converter, and converting said second operand into a second set of mixed base digits;

a multiplier connected for receiving said first and second operands and multiplying said first and second operands to produce a product;

a most significant digits detector connected to receive said first and second sets of mixed base digits and calculating a first magnitude measure of said first set of mixed base digits and a second magnitude measure of said second set of mixed base digits, said detector generating first signals indicative of a relationship between said first magnitude measure and said second magnitude measure;

a third mixed base converter connected for receiving said product from said multiplier and operable independently of results of said most significant digits detector, said third mixed base converter converting said product into a third set of mixed base digits; and a logic circuit connected for receiving said first signals and for receiving second signals based on said third set of mixed base digits, said logic circuit generating a validity signal indicative of whether or not multiplicative overflow has occurred.

2. An overflow detection processor as set forth in claim 1, wherein said first and second mixed base converters and said most significant digits detector form a first data channel, and said multiplier and third mixed base converter form a second data channel, connected in parallel to said first data channel, and wherein said processor further includes delay means positioned in one of said first and second data channels for delaying signals therein such that said logic circuit simultaneously receives said first and second signals.

3. An overflow detection processor as set forth in claim 1, wherein said first and second operands are associated with an ordered set of moduli and a highest order modulus associated with said first and second operands is greater in magnitude than all other moduli associated with said first and second operands and wherein values of a single mixed base digit associated with said highest order modulus are utilized for sign detection and multiplicative overflow detection.

4. An overflow detection processor as set forth in claim 1, wherein said first mixed base converter, said second mixed base converter, said multiplier, said most significant digits detector, said third mixed base converter, and said logic circuit comprise optical circuits.

5. An overflow detection processor as set forth in claim 4, wherein said optical circuits comprise optical cross bar circuits.

6. An overflow detection processor as set forth in claim 4, wherein said optical circuits comprise pattern recognition circuits.

7. An overflow detection processor as set forth in claim 1, wherein said first mixed base converter, said second mixed base converter, said multiplier, said most significant digits detector, said third mixed base converter, and said logic circuit comprise electronic circuits.

8. An overflow detection processor as set forth in claim 1, wherein said most significant digits detector includes a plurality of comparators arranged in parallel to one another and a plurality of modulo-2 adder circuits arranged in parallel to one another and connected to receive outputs of said plurality of comparators.

9. An overflow detection processor as set forth in claim 8, wherein each of said plurality of comparators determines whether said first and second sets of mixed base digits received are equal in value.

10. An overflow detection processor as set forth in claim 8, wherein said most significant digits detector further includes an optical arithmetic and logic unit configured to form a multiple-branch arithmetic conditional device which generates different first signals as a function of said relationship.

11. An overflow detection processor as set forth in claim 1, wherein said first operand and said second operand are both positive and are associated with an ordered set of moduli in a residue number system representation and wherein the order of moduli associated with said second operand is partially reversed from the order of moduli associated with said first operand.

12. An overflow detection processor as set forth in claim 6, wherein said most significant digits detector includes an optical arithmetic and logic unit configured to form an arithmetic conditional device having three output branches.

13. An overflow detection processor which detects whether or not multiplicative overflow has occurred during multiplication of a first operand and a second operand, said first and second operands being in a non-redundant residue number system representation, said overflow detection processor comprising:
   a first mixed base converter connected for receiving said first operand and for converting said first operand into a first set of mixed base digits and generating a first redundant residue digit corresponding to said first operand;
   a second mixed base converter connected for receiving said second operand and converting said second operand into a second set of mixed base digits and generating a second redundant residue digit corresponding to said second operand;
   a multiplier connected to receive said first and second operands and said first and second redundant residue digits and multiplying said first operand and said first redundant residue digit by said second operand and said second redundant residue digit to produce a product;
   a most significant digits detector connected for receiving said first and second sets of mixed base digits and calculating a first magnitude measure of said first set of mixed base digits and a second magnitude measure of said second set of mixed base digits and generating first signals indicative of a relationship between said first magnitude measure and said second magnitude measure;
   a third mixed base converter connected to said multiplier for receiving said product and converting said product into a third set of mixed base digits, said third mixed base converter operating independently of results of said most significant digits detector; and
   a logic circuit connected for receiving said first signals and second signals based on said third set of mixed base digits and generating a validity signal indicative of whether or not multiplicative overflow has occurred.

14. An overflow detection processor as set forth in claim 13, wherein both said first operand and said second operand are associated with an ordered set of moduli, a highest order modulus being equal to two and wherein said first and second operands represent negative numbers, and wherein said logic circuit further is operable to perform an auxiliary multiplicative overflow detection test when said product is equal to a non-redundant ring circumference divided by said highest order modulus.

15. An overflow detection processor as set forth in claim 13, wherein said first mixed base converter and said most significant digits detector form a first data channel and said second mixed base converter, said multiplier and said third mixed base converter form a second data channel, connected in parallel to said first data channel, and wherein said processor further includes delay means positioned in one of said first and second data channels for delaying signals therein such that said logic circuit simultaneously receives said first and second signals.

16. An overflow detection processor as set forth in claim 15, wherein both said first operand and said second operand are associated with an ordered set of moduli, the highest order modulus being equal to two and wherein said first and second operands represent negative numbers, and wherein said logic circuit further is operable to perform an auxiliary multiplicative overflow detection test when said product is equal to a non-redundant ring circumference divided by said highest order modulus.

17. An overflow detection processor as set forth in claim 13, wherein said first mixed base converter, said second mixed base converter, said multiplier, said most significant digits detector, said third mixed base converter, and said logic circuit comprise optical circuits.

18. An overflow detection processor as set forth in claim 17, wherein said optical circuits comprise optical cross bar circuits.

19. An overflow detection processor as set forth in claim 17, wherein said optical circuits comprise pattern recognition circuits.

20. An overflow detection processor as set forth in claim 13, wherein said first mixed base converter, said second mixed base converter, said multiplier, said most significant digits detector, said third mixed base converter, and said logic circuit comprise electronic circuits.

21. An overflow detection processor as set forth in claim 13, wherein said most significant digits detector includes a plurality of comparators arranged in parallel to one another and a plurality of modulo-2 adder circuits arranged in parallel to one another and connected to receive outputs of said plurality of comparators.

22. An overflow detection processor as set forth in claim 21, wherein each of said plurality of comparators determines whether said first and second sets of mixed base digits received are equal in value.

23. An overflow detection processor as set forth in claim 21, wherein said most significant digits detector further includes an optical arithmetic and logic unit configured to form a multiple-branch arithmetic conditional device which generates different first signals as a function of said relationship.

24. An overflow detection processor as set forth in claim 21, wherein said most significant digits detector includes an optical arithmetic and logic unit configured to form an arithmetic conditional device having three output branches.

25. An overflow detection processor as set forth in claim 13, wherein said first operand and said second operand are both positive and are associated with an ordered set of moduli in a residue number system representation and wherein the order of moduli associated with said second operand is reversed from the order of moduli associated with said first operand.

26. A method of generating a validity optical signal, comprising the steps of:
  (a) receiving first optical signals form a first plurality of optical transmission paths, said optical first signals representing a first operand in residue representation;
  (b) receiving second optical signals from a second plurality of optical transmission paths, said second optical signals representing a second operand in residue representation;
  (c) converting said first optical signals representing said first operand in residue representation into third optical signals representative of said first operand in mixed base representation;
  (d) converting said second optical signals representing said second operand in residue representation into fourth optical signals representative of said second operand in mixed base representation;
  (e) multiplying said first optical signals and said second optical signals to produce product optical signals;
  (f) generating a most significant digits optical signal indicative of whether or not a first magnitude measure associated with said third optical signals is greater than a second magnitude measure associated with said fourth optical signals;
  (g) generating fifth optical signals independently of results of step (f), said fifth optical signals corresponding to a mixed base representation of said product optical signals;
  (h) time delaying at least one of said most significant digits optical signal and said fifth optical signals such that said most significant digits optical signal and said fifth optical signals arrive at an optical logic circuit at the same time; and
  (i) subsequent to steps (a) through (h), transmitting, from said optical logic circuit, a validity optical signal indicating whether or not multiplicative overflow has occurred based on said most significant digits optical signal and said fifth optical signals.

27. A method as set forth in claim 26, wherein step (f) includes the step of:
  comparing subsets of said third and fourth signals in comparators, said comparing being performed simultaneously for all subsets.

28. A method of generating a validity optical signal, comprising the steps of:
  (a) receiving first optical signals from a first plurality of optical transmission paths, said first optical signals representing a first operand in residue representation;
  (b) receiving second optical signals from a second plurality of optical transmission paths, said second optical signals representing a second operand in residue representation;
  (c) converting said first optical signals representing said first operand in residue representation into third optical signals representative of said first operand in mixed base representation and generating first redundant residue digit optical signals corresponding to a redundant residue digit associated with said first operand;
  (d) converting said second optical signals representing said second operand in residue representation into fourth optical signals representative of said second operand in mixed base representation and generating second redundant residue digit optical signals corresponding to a redundant residue digit associated with said second operand;
  (e) multiplying said first optical signals and said first redundant residue digit optical signals and said second optical signals and said second redundant residue digit optical signals to produce product optical signals;
  (f) generating a most significant digits optical signal indicative of whether or not a first magnitude measure associated with said third optical signals is greater than a second magnitude measure associated with said fourth optical signals;
  (g) generating fifth optical signals independently of results of step (f), said fifth optical signals corresponding to a mixed base representation of said product optical signals;
  time delaying at least one of said most significant digits optical signal and said fifth optical signals such that said most significant digits optical signal and said fifth optical signals arrive at an optical logic circuit at the same time; and
  (i) subsequent to steps (a) through (h), transmitting, from said optical logic circuit, a validity optical signal indicating whether or not multiplicative overflow has occurred based on said most significant digits optical signal and said fifth optical signals.

29. A method as set forth in claim 28, wherein step (f) includes the step of:
  comparing subsets of said third and fourth signals in comparators, said comparing being performed simultaneously for all subsets.

30. A most significant digit detector comprising:
  a plurality of comparators arranged parallel to one another, said plurality of comparators receiving a plurality of first signals indicative of a set of digits and comparing each signal of said plurality of first signals with at least one other signal of said plurality of first signals; and
  a plurality of modulo-2 adder circuits arranged parallel to one another and connected to receive outputs from said plurality of comparators, said plurality of modulo-2 adder circuits transmitting an output signal indicating a most significant digit.

31. A most significant digits detector as set forth in claim 30, wherein said plurality of comparators and said plurality of modulo-2 adder circuits include optical circuits.

32. A most significant digits detector as set forth in claim 30, wherein said plurality of comparators essentially simultaneously compare subsets of said set of digits.

33. A most significant digits detector as set forth in claim 30, wherein said plurality of comparators receives first signals corresponding to zero digit values and first signals corresponding to digit values of $m_i-1$, where i is an integer and $m_i$ is a number system modulus.

34. A most significant digits detector as set forth in claim 30, wherein:

each of said plurality of comparators generates either an equal signal or a non-equal signal;

each of said plurality of modulo-2 adder circuits has two zero inputs and two one inputs; and at least one of said equal signals is connected to one inputs of adjacent modulo-2 adder circuits and at least one of said non-equal signals is connected to zero inputs of adjacent modulo-2 adder circuits.

35. A most significant digits detector as set forth in claim 30, wherein said plurality of comparators and said plurality of modulo-2 adder circuits include electrical circuits.

* * * * *